(12) United States Patent
Iyasu et al.

(10) Patent No.: US 10,491,136 B2
(45) Date of Patent: Nov. 26, 2019

(54) BRIDGE-LESS TYPE ELECTRIC POWER CONVERSION DEVICE HAVING CURRENT DETECTION CIRCUIT OF CURRENT TRANSFORMER TYPE

(71) Applicant: DENSO CORPORATION, Kariya, Aichi-pref. (JP)

(72) Inventors: Seiji Iyasu, Nisshin (JP); Yuji Hayashi, Nisshin (JP); Yuichi Handa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/142,642

(22) Filed: Sep. 26, 2018

(65) Prior Publication Data

US 2019/0123661 A1   Apr. 25, 2019

(30) Foreign Application Priority Data

Oct. 23, 2017   (JP) ................. 2017-204746

(51) Int. Cl.
*H02M 1/42*  (2007.01)
*H02M 1/10*  (2006.01)
(Continued)

(52) U.S. Cl.
CPC ........... *H02M 7/217* (2013.01); *H02M 7/219* (2013.01); *H02M 1/4233* (2013.01); *H02M 2001/0009* (2013.01)

(58) Field of Classification Search
CPC ...... H02M 7/217; H02M 1/4208; H02M 1/08; H02M 7/219; H02M 2001/0009; H02M 3/335; H02M 3/33507; H02M 3/33523; H02M 3/33592; G01R 19/00; G01R 19/0092; G01R 19/22
See application file for complete search history.

(56) References Cited

U.S. PATENT DOCUMENTS 7,164,591 B2 *  1/2007  Soldano ............. H02M 1/4225
                                          363/89
8,564,993 B2 * 10/2013  Lin ..................... H02M 1/4208
                                          363/127
(Continued)

FOREIGN PATENT DOCUMENTS

JP   2010-104233 A   5/2010
JP   2011-130572 A   6/2011
(Continued)

*Primary Examiner* — Gustavo A Rosario-Benitez
(74) *Attorney, Agent, or Firm* — Oliff PLC

(57) ABSTRACT

An electric power conversion device has an electric power converter and a control device. The control device adjusts an output voltage of the electric power converter to approach a first current flowing a first drive switch to an instruction current during a first period in which an input voltage supplied from an AC power source has a positive polarity, and adjusts the output voltage of the electric power converter to approach a second current flowing a second drive switch to the instruction current during a second period in which the input voltage supplied from the AC power source has a negative polarity. The control device operates a switch arranged in a second current sensor during the first period, and operates a switch arranged in a first current sensor during the second period.

5 Claims, 18 Drawing Sheets

(51) Int. Cl.
*H02M 7/217* (2006.01)
*H02M 7/219* (2006.01)
*H02M 1/00* (2006.01)

(56) References Cited

U.S. PATENT DOCUMENTS

| | | | |
|---|---|---|---|
| 9,941,784 B1* | 4/2018 | Li | H02M 1/4208 |
| 9,997,994 B1* | 6/2018 | Luo | H02M 1/4233 |
| 2003/0080723 A1* | 5/2003 | Chen | G01R 19/003 |
| | | | 324/76.29 |
| 2007/0058402 A1* | 3/2007 | Shekhawat | H02M 1/42 |
| | | | 363/89 |
| 2011/0013436 A1* | 1/2011 | Gan | H02M 1/4208 |
| | | | 363/126 |
| 2011/0038182 A1* | 2/2011 | Li | H02M 3/33592 |
| | | | 363/21.06 |
| 2011/0103112 A1* | 5/2011 | Jiang | H02M 3/33507 |
| | | | 363/125 |
| 2012/0293141 A1* | 11/2012 | Zhang | H02M 1/4233 |
| | | | 323/207 |
| 2013/0016539 A1* | 1/2013 | Nishibori | H02M 1/4225 |
| | | | 363/44 |
| 2013/0058134 A1 | 3/2013 | Yamada et al. | |
| 2015/0280547 A1* | 10/2015 | Pu | H02M 1/4225 |
| | | | 363/89 |
| 2016/0079873 A1 | 3/2016 | Inoue et al. | |
| 2017/0309395 A1 | 10/2017 | Shiraki et al. | |

FOREIGN PATENT DOCUMENTS

| | | |
|---|---|---|
| JP | 2011-130573 A | 6/2011 |
| JP | 2015-112543 A | 6/2015 |
| JP | 2015-139337 A | 7/2015 |
| JP | 2015-186407 A | 10/2015 |
| JP | 2015-198460 A | 11/2015 |
| JP | 2016-115864 A | 6/2016 |
| JP | 2016-192889 A | 11/2016 |
| WO | 2013/042539 A1 | 3/2013 |

\* cited by examiner

FIG.4A Vac
FIG.4B AQ1
FIG.4C AQ2
FIG.4D CT1
FIG.4E CT2
FIG.4F GS1
FIG.4G GS2
FIG.4H IL
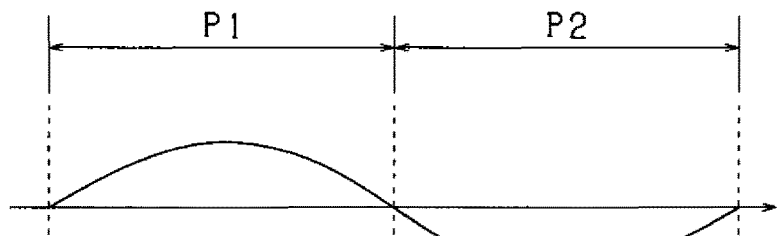
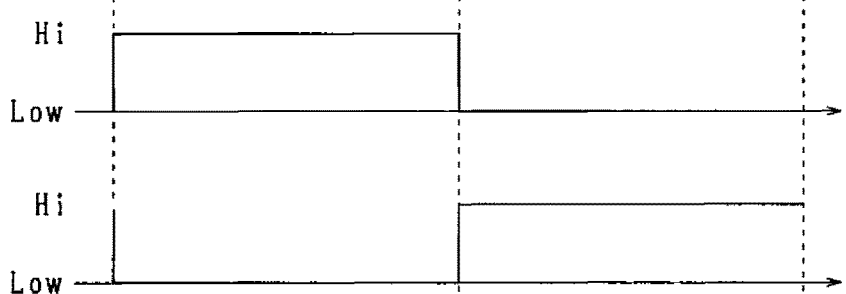
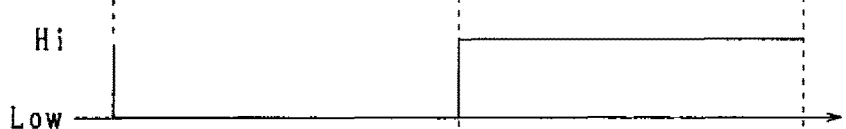
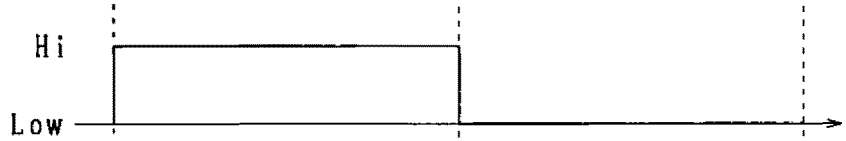
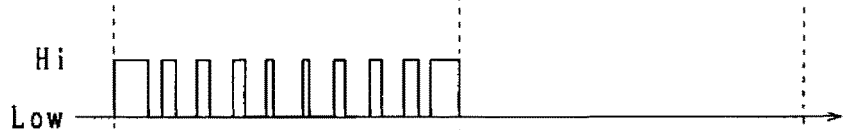
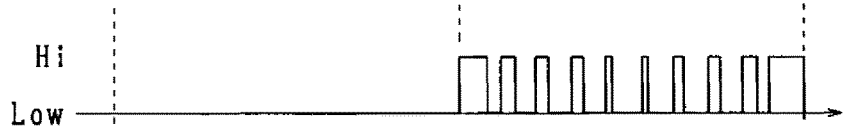
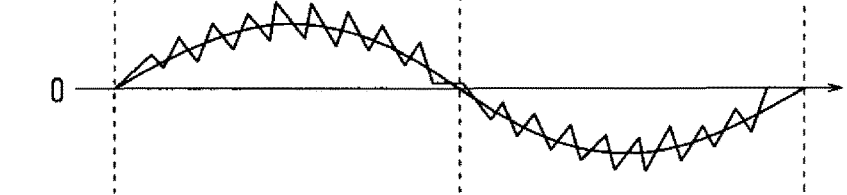

FIRST CURRENT STATE HAVING FIRST CURRENT FLOW PASSAGE

SECOND CURRENT STATE HAVING SECOND CURRENT FLOW PASSAGE

THIRD CURRENT STATE HAVING THIRD CURRENT FLOW PASSAGE

FOURTH CURRENT STATE HAVING FOURTH CURRENT FLOW PASSAGE

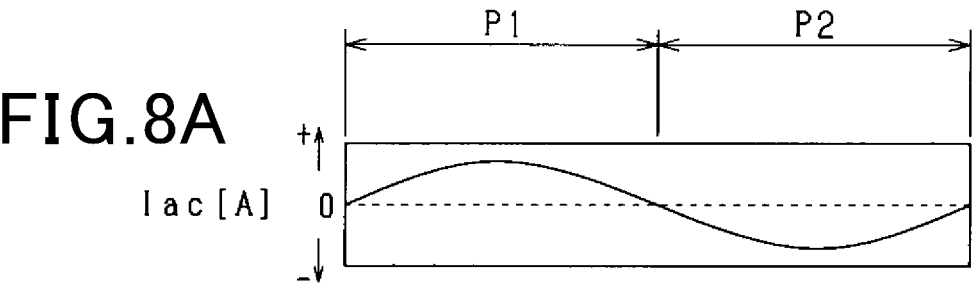
FIG.8A  Iac [A]
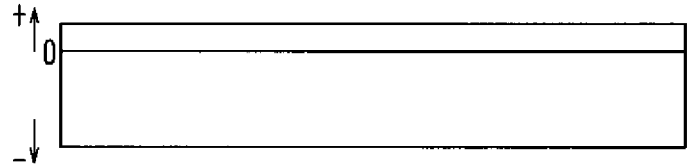
FIG.8B
EXCITATION CURRENT
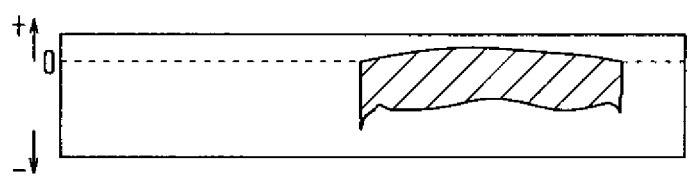
FIG.8C
EXCITATION VOLTAGE
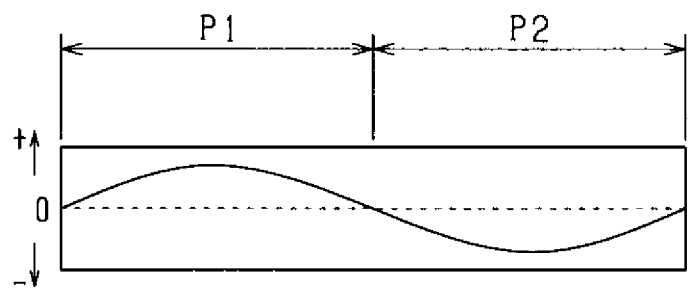
FIG.9A  Iac [A]
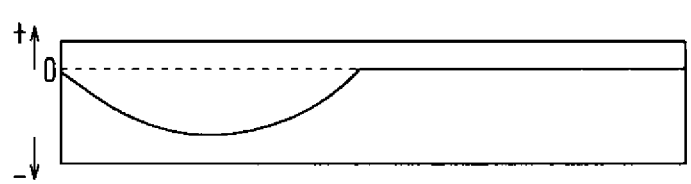
FIG.9B
EXCITATION CURRENT
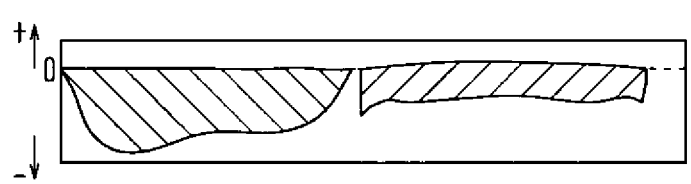
FIG.9C
EXCITATION VOLTAGE

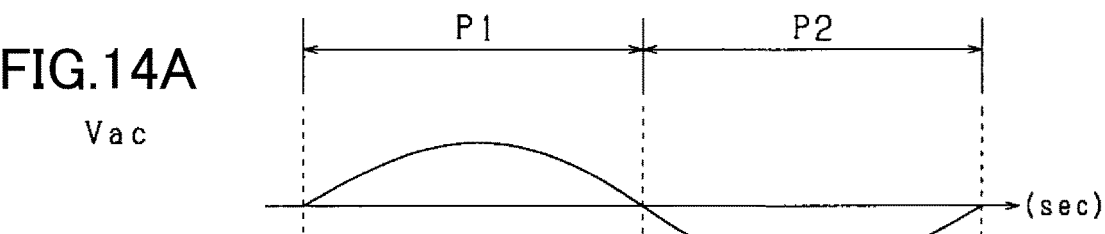
FIG.14A Vac
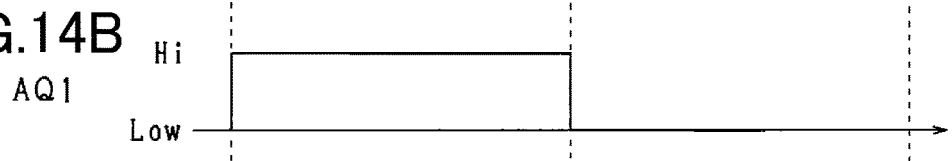
FIG.14B AQ1
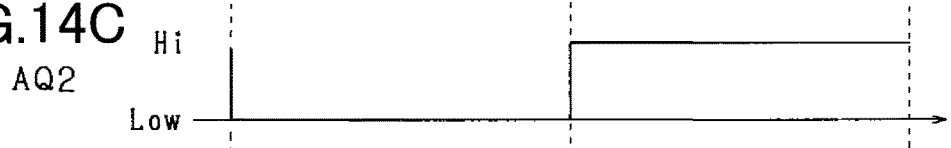
FIG.14C AQ2
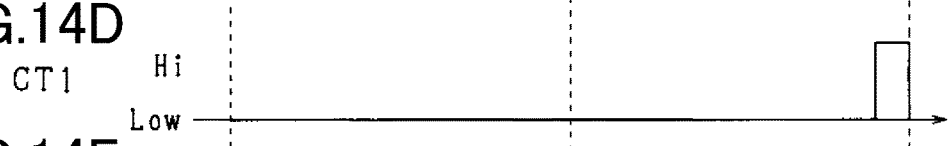
FIG.14D CT1
FIG.14E CT2
FIG.14F GS1
FIG.14G GS2
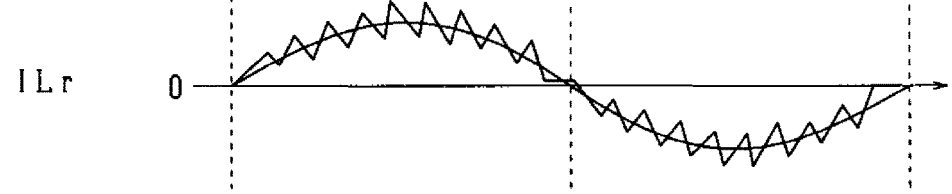
FIG.14H ILr FIG.17A Vac
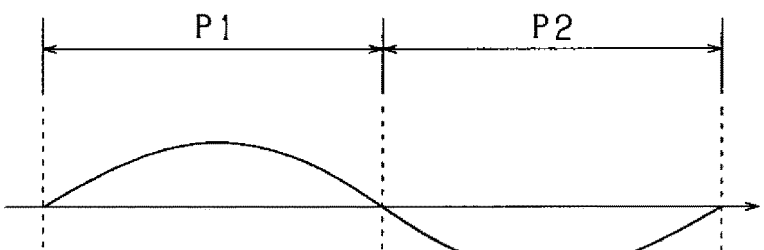
FIG.17B AQ1
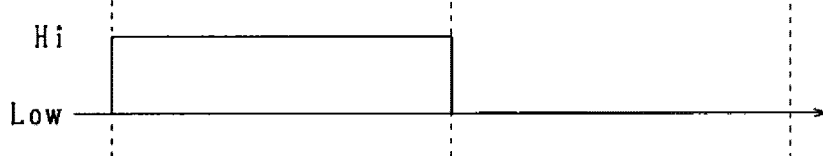
FIG.17C AQ2
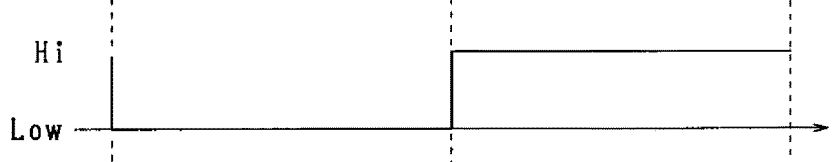
FIG.17D CT1
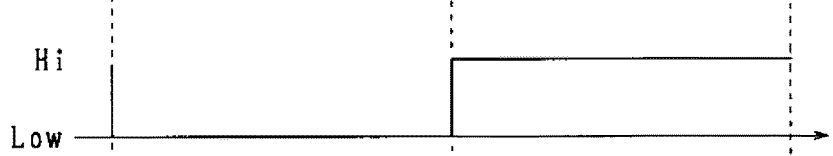
FIG.17E CT2
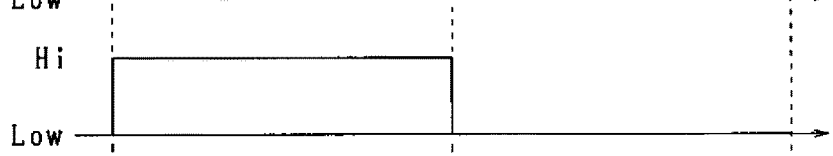
FIG.17F GS1
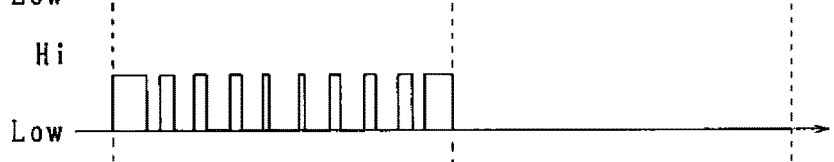
FIG.17G GS2
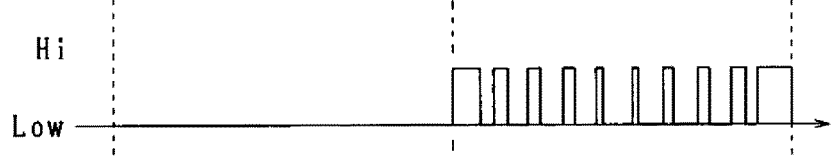
FIG.17H GS3
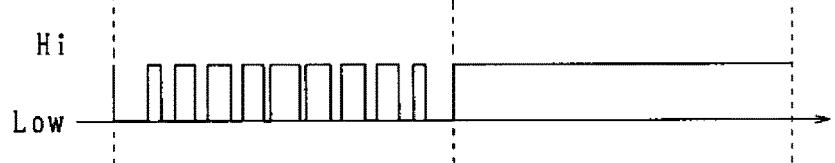
FIG.17I GS4
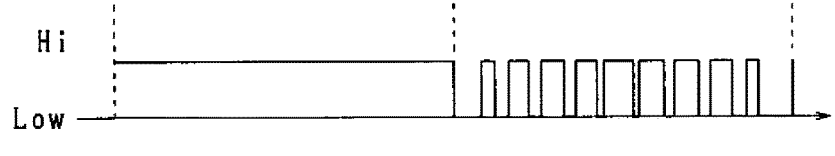

BRIDGE-LESS TYPE ELECTRIC POWER CONVERSION DEVICE HAVING CURRENT DETECTION CIRCUIT OF CURRENT TRANSFORMER TYPE

CROSS-REFERENCE TO RELATED APPLICATION

This application is related to and claims priority from Japanese Patent Application No. 2017-204746 filed on Oct. 23, 2017, the contents of which are hereby incorporated by reference.

BACKGROUND OF THE INVENTION

1. Field of the Invention

The present invention relates to electric power conversion devices for converting alternating current power to direct current power.

2. Description of the Related Art

Patent document 1, Japanese patent laid open publication No. 2015-198460 discloses an electric power conversion device having a diode bridge, a reactor, a driving switch and a current detection circuit. The reactor is connected in series to an output-side terminal of the diode bridge. A current flowing in the reactor is adjusted by the driving switch. The current detection circuit detects a current which flows in the driving switch from the reactor.

The electric power conversion device disclosed in the patent document 1 receives an alternating current voltage (AC voltage) supplied from an electric power source, and the diode bridge converts the received AC voltage into a direct current voltage (DC voltage).

When the driving switch is driven, the converted DC voltage is supplied to an output terminal of the electric power conversion device through the reactor. At this time, the driving switch is turned on and off so as to adjust the current detected by the current detection circuit to match an instructed current value.

There has been used a bridge-less type electric power conversion device which does not have any bridge circuit. When the bridge-less type electric power conversion device uses a current detection circuit of a current transformer type (CT type current detection circuit), the inventors of the present invention have noticed the following drawback. That is, thermal energy is easily generated and a current detection error easily occurs in a bridge-less type electric power conversion device when compared with an electric power conversion device having the diode bridge arranged at the input-side of the electric power conversion device.

SUMMARY

It is therefore desired to provide an electric power conversion device of a bridge-less type having a current detection circuit of a current transformer type (CT type), capable of suppressing thermal energy from being generated in the current detection circuit and of reducing a current detection error.

In accordance with a preferred aspect of the present invention, there is provided an electric power conversion device having an electric power converter and a control device.

The electric power converter is capable of converting an input alternating current voltage (input AC voltage) supplied from alternating current power source (AC power source) to direct current voltage (DC voltage). The electric power converter supplies the DC voltage through an output terminal of the electric power conversion device to outside. The control device is capable of controlling the electric power converter.

The electric power converter has a reactor connected to the AC power source, a first drive switch, a second drive switch, a first current sensor connected to the first drive switch, and a second current sensor connected to the second drive switch.

The first current sensor has a first current transformer, a first detection resistance, a first rectifier diode and a detection switch. The first current transformer has a primary coil and a secondary coil, the first detection resistance connected parallel with the secondary coil of the first current transformer. The first rectifier diode is capable of allowing a current to flow from the secondary coil to the first detection resistance when a positive current flows in the secondary coil of the first current transformer. The first rectifier diode is capable of prohibiting the current from flowing to the first detection resistance from the secondary coil of the first current transformer when a negative current flows in the secondary coil of the first current transformer. The detection switch is arranged parallel with one of the primary coil and the secondary coil. An auxiliary coil is magnetically connected with the primary coil and the secondary coil of the first transformer.

The second current sensor has a second current transformer, a second detection resistance, a second rectifier diode, and a detection switch. The second current transformer has a primary coil and a secondary coil. The second detection resistance is connected parallel with the secondary coil of the second current transformer. The second rectifier diode is capable of allowing a current to flow from the secondary coil of the second current transformer to the second detection resistance when a positive current flows in the secondary coil of the second current transformer. The second rectifier diode is capable of prohibiting the current from flowing to the second detection resistance from the secondary coil of the second current transformer when a negative current flows in the secondary coil of the second current transformer. The detection switch is arranged parallel with one of the primary coil and the secondary coil. An auxiliary coil is magnetically connected with the primary coil and the secondary coil of the second transformer.

The control device performs turns on/off control of the first drive switch and the second drive switch so as to determine, as an instruction current, a first current flowing in the first drive switch during a first period in which the input AC voltage has a positive polarity, and to determine, as the instruction current, a second current flowing in the second drive switch during a second period in which the input AC voltage has a negative polarity. The control device turns on the detection switch of the second current sensor during the first period, and turns on the detection switch of the first current sensor during the second period.

The current detection part composed of the first current sensor and the second current sensor. The current transformer is composed of the first current transformer and the second current transformer. The detection resistance is composed of the first detection resistance and the second detection resistance. The diode is composed of the first rectifier diode and the second rectifier diode.

The diode allows the current to flow from the secondary coil to the detection resistance when the positive current flows in the secondary coil of the current transformer. The diode prohibits the current from flowing to the detection resistance from the secondary coil when the negative current flows in the secondary coil of the current transformer.

The electric power conversion device has the control device to determine, as the instruction current, the first current flowing in the first drive switch during the first period in which the input voltage supplied from the AC power source has a positive polarity, and to determine, as the instruction current, the second current flowing in the second drive switch during the second period in which the input voltage supplied from the AC power source has a negative polarity.

In the electric power conversion device having the structure previously described, a negative current flows in the current transformer of the second current sensor during the first period in which the input voltage supplied from the AC power source has a positive polarity, and a positive current flows in the current transformer of the first current sensor during the second period in which the input voltage supplied from the AC power source has a negative polarity.

The inventors according to the present invention have found a phenomenon in which when such a negative current flows in the current transformer, the negative current does not flow in the detection resistance in the current detection part due to the presence of the diode, and the negative current flows in the excitation inductance in the current transformer and the flow of this negative current increases a density of the magnetic flux of the current transformer. When the magnetic flux in the current transformer is saturated, this phenomenon allows an excess current to flow in the current sensor such as the first current detection sensor and the second current detection sensor. This often reduces the detection accuracy of each of the first current sensor and the second current sensor.

In order to avoid the drawback due to the phenomenon previously described, the electric power conversion device according to the present invention has the improved structure in which each of the first current sensor and the second current sensor as the current detection part has the detection side switch arranged parallel with the primary coil and the secondary coil of the current transformer or the auxiliary coil magnetically connected with the primary coil and the secondary coil.

During the first period, the turned-on of the detection side switch in the second current sensor prohibits the excitation current from flowing in the current transformer and suppresses the magnetic flux from increasing. During the second period, the turned-on of the detection side switch in the first current sensor prohibits the excitation current from flowing in the current transformer and suppresses the magnetic flux from increasing.

In the electric power conversion device having the current detection sensors of a CT type, this improved structure makes it possible to suppress thermal energy from increasing in each of the first current sensor and the second current sensor, and to reduce a current detection error.

BRIEF DESCRIPTION OF THE DRAWINGS

A preferred, non-limiting embodiment of the present invention will be described by way of example with reference to the accompanying drawings, in which:

FIG. 4A to FIG. 4H show timing charts explaining operation of an the electric power conversion device according to the first exemplary embodiment of the present invention;

FIG. 8A is a view showing a transition of the input current flowing in the input terminal;

FIG. 8B is a view showing a transition of the excitation current flowing in a second current transformer in the second current sensor of the AC-DC converter 10;

FIG. 8C is a view showing a transition of the excitation voltage of the second current transformer in the second current sensor of the AC-DC converter;

FIG. 9A is a view showing a transition of the input current flowing in the input terminal in a comparative example without the second switch;

FIG. 9B is a view showing a transition of the excitation current flowing in the second current transformer in the comparative example without the second switch;

FIG. 9C is a view showing a transition of the excitation voltage of the second current transformer in the comparative example without the second switch;

FIG. 14A to FIG. 14H are timing charts explaining operation of the electric power conversion device having the AC-DC converter and the control device according to the second exemplary embodiment of the present invention;

FIG. 17A to FIG. 17I are timing charts explaining operation of the electric power conversion device according to the third exemplary embodiment of the present invention;

DETAILED DESCRIPTION OF THE PREFERRED EMBODIMENTS

Figure 1:
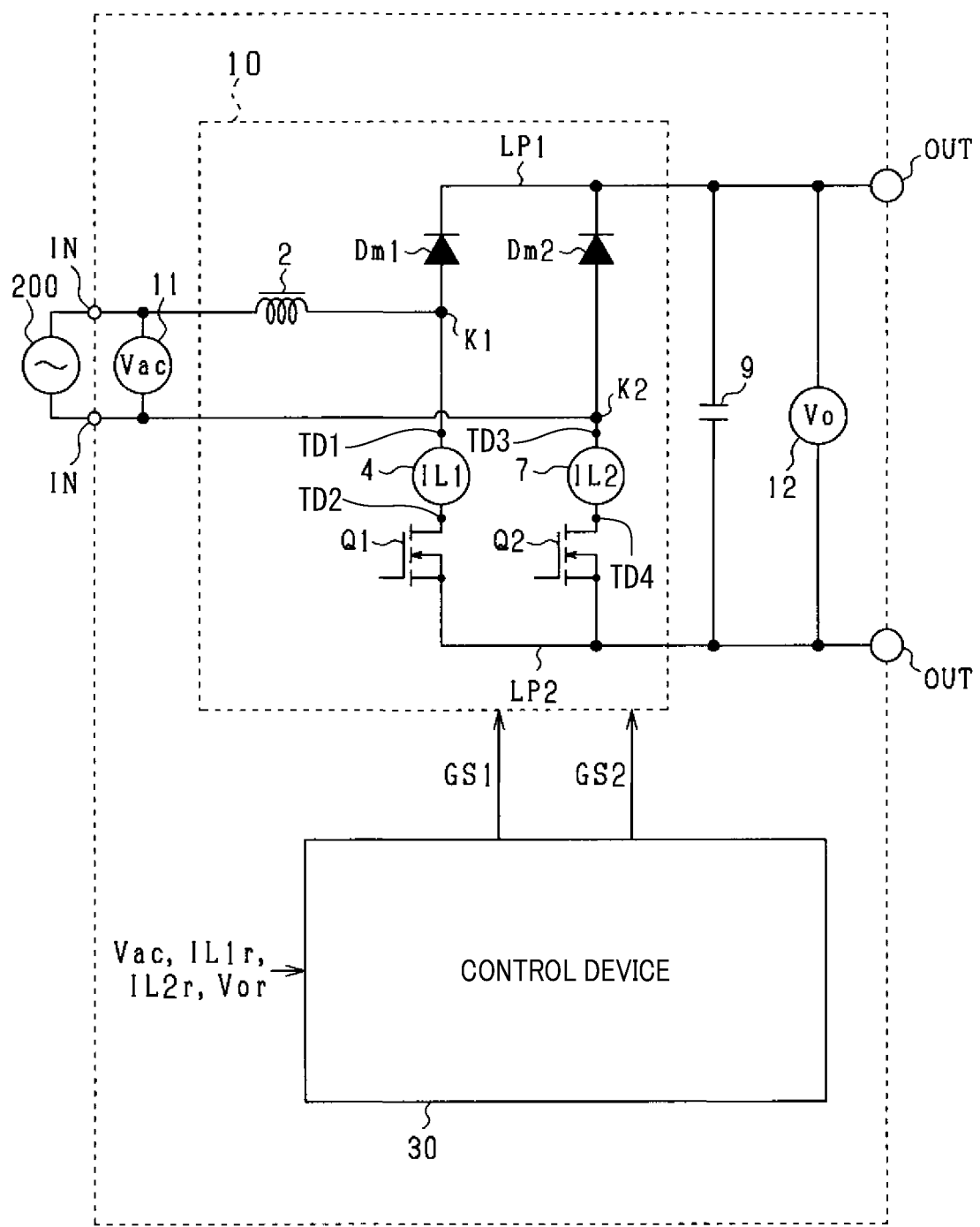
FIG. 1 is a view showing a structure of an electric power conversion device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of an electric power conversion device 100 according to a first exemplary embodiment of the present invention with reference to FIG. 1 to FIG. 12.

FIG. 1 is a view showing a structure of the electric power conversion device 100 according to the first exemplary embodiment of the present invention. As shown in FIG. 1, the electric power conversion device 100 has an alternating current-direct current (AC-DC) converter 10 and a smoothing capacitor 9. The AC-DC converter 10 operates as an electric power conversion unit. Alternating current power source 200 (AC power source 200) is connected to input terminals IN of the electric power conversion device 100. Output terminals OUT of the electric power conversion device 100 are connected to one or more loads (not shown). The electric power conversion device 100 converts an AC input voltage supplied from the AC power source 200 to a DC voltage. The electric power conversion device 100 supplies the DC voltage to the loads through the output terminals OUT.

The AC-DC converter 10 is a bridge-less PFC circuit which does not have a diode bridge at the input side thereof. The AC-DC converter 10 has a reactor 2, a first drive switch Q1, a first main diode Dm1, a second drive switch Q2, and a second main diode Dm2. Each of the first drive switch Q1 and the second drive switch Q2 is a N channel metal oxide semiconductor field effect transistor (N channel MOS FET).

A description will now be given of a detailed structure of the AC-DC converter 10.

In the AC-DC converter 10, an anode of the first main diode Dm1 is connected to a drain of the first drive switch Q1 so as to form a series connection unit of the first main diode Dm1 and the first drive switch Q1. An anode of the second main diode Dm2 is connected to a drain of the second drive switch Q2 so as to form a series connection unit of the second main diode Dm2 and the second drive switch Q2.

A cathode of the first main diode Dm1 and a cathode of the second main diode Dm2 are connected to a first line LP1 connected to the output terminals OUR, respectively. A source of the first drive switch Q1 and a source of the second drive switch Q2 are connected to a second line LP2 connected to the output terminals OUT, respectively.

The first main diode Dm1 corresponds to a first drive-side rectifier element, and the second main diode Dm2 corresponds to a second drive-side rectifier element.

A first connection node K1 between the first main diode Dm1 and the first drive switch Q1 is connected to a first terminal of the AC power source 200 through the reactor 2. A second connection node K2 between the second main diode Dm2 and the second drive switch Q2 is connected to a second terminal of the AC power source 200 through the reactor 2.

The smoothing capacitor 9 is connected between the first line LP1 and the second line LP2. That is, as shown in FIG. 1, the smoothing capacitor 9 is connected parallel to the series connection unit composed of the first main diode Dm1 and the first drive switch Q1, and parallel to the series connection unit of the second main diode Dm2 and the second drive switch Q2.

The electric power conversion device 100 has a control device 30. The control device 30 is composed of a microcomputer which is widely known. The control device 30 transmits instruction signals to the AC-DC converter 10 so as to turn on and off the first drive switch Q1 and the second drive switch Q2 in the AC-DC converter 10. It is sufficient to use an integrated circuit having a plurality of functional blocks so as to form the control device 30.

The electric power conversion device 100 further has an input voltage sensor 11, an output voltage sensor 12, a first current sensor 4 and a second current sensor 7. The first current sensor 4 and the second current sensor 7 form a current detection part.

The input voltage sensor 11 is arranged parallel to the AC power source 200 and connected between the first terminal and the second terminal of the AC power source 200. The input voltage sensor 11 detects, as an input voltage Vac of the AC-DC converter 10, a voltage between the first terminal and the second terminal of the AC power source 200.

The output voltage sensor 12 is arranged parallel to the smoothing capacitor 9 at the output-side of the AC-DC converter 10 and connected to the output terminals OUT of the electric power conversion device 100. The output voltage sensor 12 detects, as an output voltage Vo of the AC-DC converter 10, a terminal voltage of the smoothing capacitor 9.

The first current sensor 4 corresponds to a first current detection part, and the second current sensor 7 corresponds to a second current detection part.

The first current sensor 4 detects, as a first current $IL1r$, a current which flows in the first drive switch Q1. The second current sensor 7 detects, as a second current $IL2r$, a current which flows in the second drive switch Q2.

In the structure of the AC-DC converter 10 of the electric power conversion device 100 according to the first exemplary embodiment shown in FIG. 1, the first current sensor 4 is arranged at the first drive switch Q1 side on a wiring which connects the anode of the first main diode Dm1 with the drain of the first drive switch Q1. The second current sensor 7 is arranged at the second drive switch Q2 side on a wiring which connects the anode of the second main diode Dm2 with the drain of the second drive switch Q2.

Figure 2A:
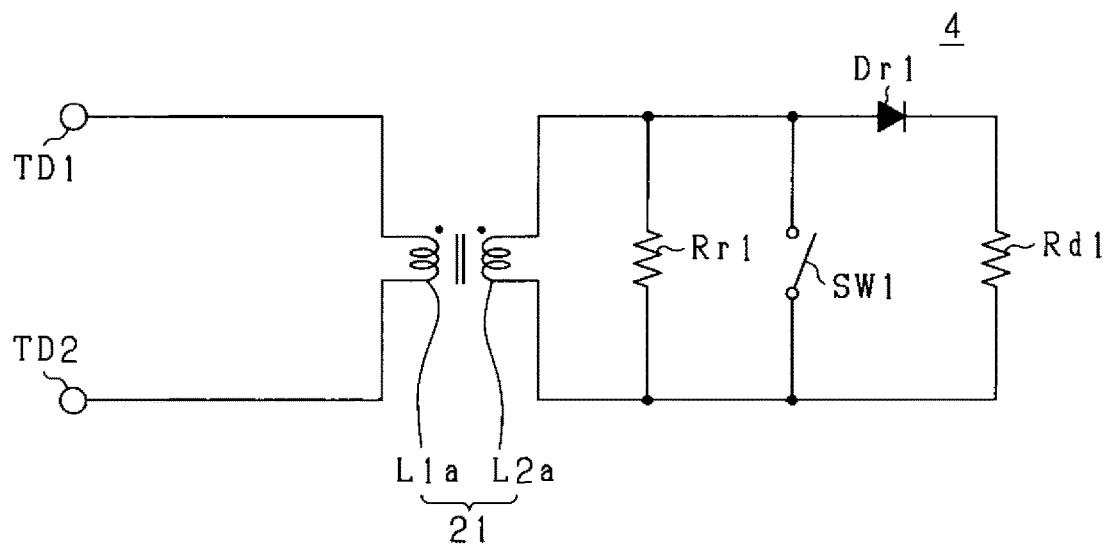
FIG. 2A is a view showing a circuit structure of a first current sensor in a AC-DC converter in the electric power conversion device according to the first exemplary embodiment of the present invention.

FIG. 2A is a view showing a circuit structure of the first current sensor 4 in the AC-DC converter 10 in the electric power conversion device 100 according to the first exemplary embodiment of the present invention.

As shown in FIG. 2A, the first current sensor 4 has a first current transformer 21, a first reset resistance Rr1, a first detection resistance Rd1 and a first rectifier diode Dr1.

A first detection terminal TD1 and a second detection terminal TD2 of the first current sensor 4 are connected to the anode of the first main diode Dm1 and the drain of the first drive switch Q1, respectively. Specifically, as shown in FIG. 1, the first detection terminal TD1 is connected to the anode of the first main diode Dm1, and the second detection terminal TD2 is connected to the drain of the first drive switch Q1.

The first current transformer has a primary side coil L1a and a secondary side coil L2a. The primary side coil L1a and the secondary side coil L2a are magnetically connected together. The primary side coil L1a and the secondary side coil L2a in the first current transformer have a demagnetization relationship.

The turn number N2 of the secondary side coil L2a is more than the turn number N1 of the primary coil L1a. In the structure of the in the AC-DC converter 10 of the electric power conversion device 100 according to the first exemplary embodiment, the turn number N1 of the primary side coil L1a is a reference turn number. The turn number ratio of the primary side coil L1a and the secondary side coil L2a is calculated by using the following equation (1).

$$Nr=N2/N1 \quad (1),$$

where Nr indicates the turn number ratio.

The first detection terminal TD1 is connected to a first terminal of the primary side coil L1a (input winding), and the second detection terminal TD2 is connected to a second terminal of the primary side coil L1a.

A first terminal of the secondary side coil L2a is connected to an anode of the first rectifier diode Dr1, and an cathode of the first rectifier diode Dr1 is connected to a first terminal of the first detection resistance Rd1. A second terminal of the secondary side coil L2a is connected to a second terminal of the first detection resistance Rd1.

The secondary side coil L2a is connected parallel to the first reset resistance Rr1 and a first detection switch SW1 (hereinafter the first switch SW1).

When the first switch SW1 is turned on, a current path is generated between the first terminal and the second terminal of the secondary side coil L2a. Specifically, the first terminal of the first switch SW1 is connected between the first terminal of the secondary side coil L2a and the anode of the first rectifier diode Dr1, and the second terminal of the first switch SW1 is connected between the second terminal of the secondary side coil L2a and the second terminal of the first detection resistance Rd1.

Figure 2B:
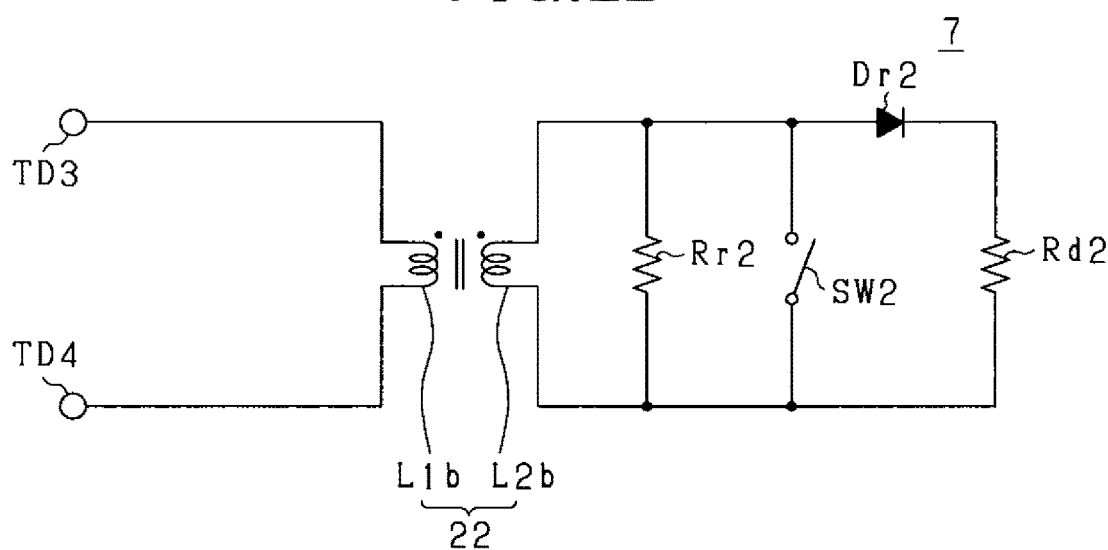
FIG. 2B is a view showing a circuit structure of a second current sensor in the AC-DC converter in the electric power conversion device according to the first exemplary embodiment of the present invention.

In the structure of the first current sensor 4 in the AC-DC converter 10 of the electric power conversion device 100 according to the first exemplary embodiment, as shown in FIG. 2B, a positive current flows in the primary side coil L1a from the first detection terminal TD1 to the second detection terminal TD2. A negative current flows in the primary side coil L1a from the second detection terminal TD2 to the first detection terminal TD1.

When the positive current flows in the primary side coil L1a, a current, which corresponds to the turn number ratio Nr, flows to the anode of the first rectifier diode Dr1, and a voltage reduction occurs in the first detection resistance Rd1 because a current flows in the first detection resistance Rd1 through the first rectifier diode Dr1. That is, the first current sensor 4 detects a current due to the voltage drop generated in the first detection resistance Rd1 so as to obtain the first current $IL1r$.

On the other hand, when a negative current flows in the primary side coil L1a, a current flowing in the secondary side coil L2a is limited by the first rectifier diode Dr1, and does not flow in the first detection resistance Rd1 when the first switch SW1 is open, i.e. in a turned-off state. In this case, the current flows in the excitation inductance of the first current transformer 21.

FIG. 2B is a view showing a circuit structure of a second current sensor 7 in the AC-DC converter 10 in the electric power conversion device 100 according to the first exemplary embodiment of the present invention.

Because the second current sensor 7 shown in FIG. 2B and the first current sensor 4 shown in FIG. 2A have the identical structure, the explanation of the second current sensor 7 is omitted here for brevity.

As shown in FIG. 2A, the second current sensor 7 has a second current transformer 22, a second reset resistance Rr2, a second detection resistance Rd2 and a second rectifier diode Dr2.

The second current sensor 7 has a primary side coil L1b and a secondary side coil L2b. The primary side coil L1b and the secondary side coil L2b are magnetically connected together. Similar to the first current transformer 21 in the first current sensor 4 previously described, the secondary side coil L2b in the second current sensor 7 has a turn number which is more than the turn number of the primary side coil Lib.

As shown in FIG. 2B, a third detection terminal TD3 and a fourth detection terminal TD3 of the second current sensor 7 are connected to the drain of the second drive switch Q2 and the anode of the second main diode Dm2, respectively. Specifically, as shown in FIG. 1, the third detection terminal TD3 of the second current sensor 7 is connected to the anode of the second main diode Dm2, and the fourth detection terminal TD4 of the second current sensor 7 is connected to the drain of the second drive switch Q2. That is, the third detection terminal TD3 is connected to a first terminal of the primary side coil L1b, and the fourth detection terminal TD4 is connected to a second terminal of the primary side coil L1b.

It is sufficient to use a bi-directional type switch capable of flowing in both directions as each of the first switch SW1 and a second detection switch SW2 (hereinafter the second switch SW2). For example, it is possible to use a series-connection unit composed of two MOS FETs in which both sources thereof are connected together. In the structure of the electric power conversion device according to the first exemplary embodiment, the first switch SW1 in the first current sensor 4 and the second switch SW2 in the second current sensor 7 correspond to detection side switches.

In the structure of the AC-DC converter 10 of the electric power conversion device 100 according to the first exemplary embodiment as shown in FIG. 2, a positive current flows in the primary side coil L1b of the second current sensor 7 from the third detection terminal TD3 to the fourth detection terminal TD4. A negative current flows in the primary side coil L1b of the second current sensor 7 from the fourth detection terminal TD4 to the third detection terminal TD3.

The input voltage sensor 11, the output voltage sensor 12, the first current sensor 4 and the second current sensor 7 transmit detection results, i.e. detection signals Vac, Vor, IL1r and IL2r to the control device 30.

Figure 3:
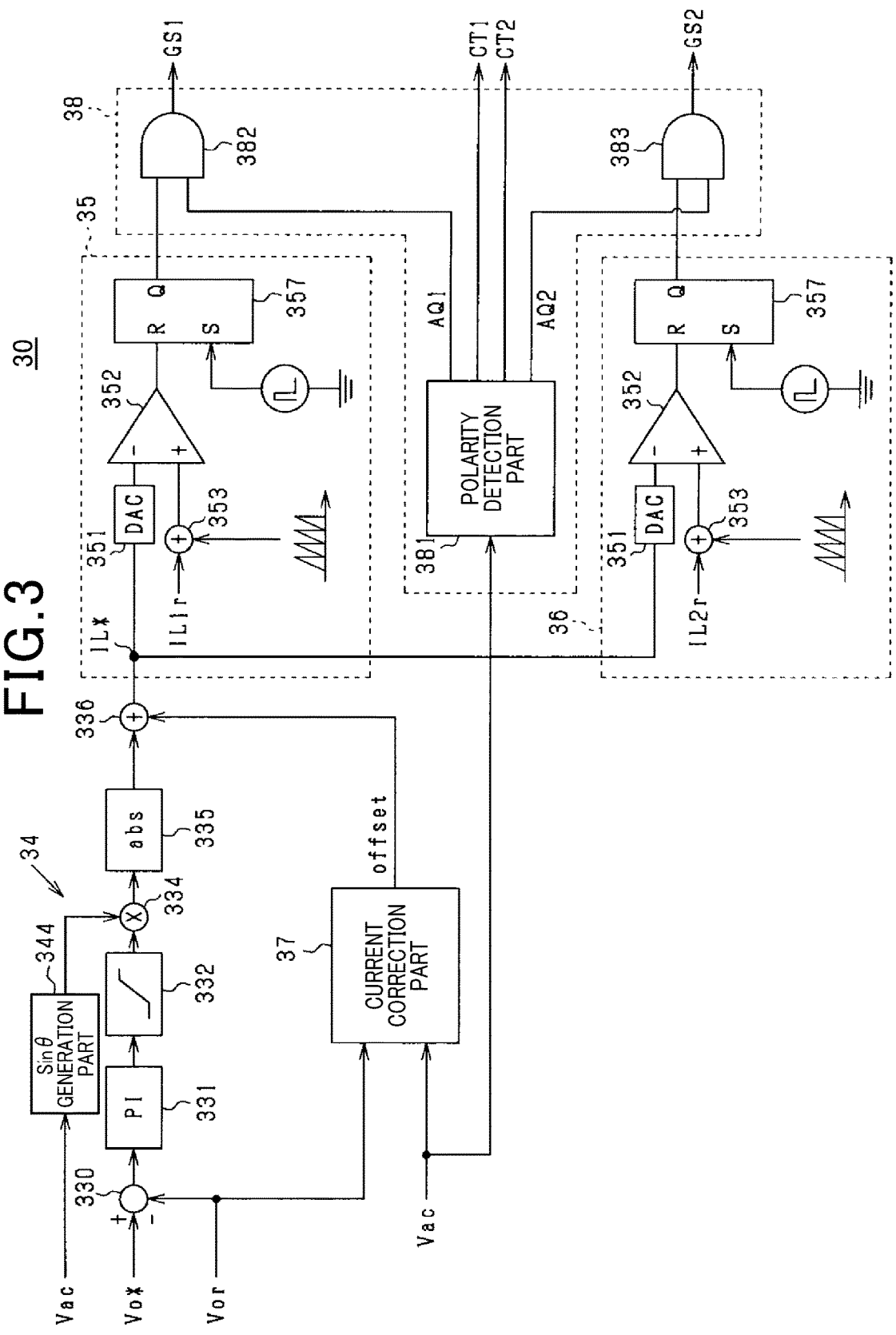
FIG. 3 is a view showing functional blocks of a control device in the electric power conversion device according to a first exemplary embodiment of the present invention.

FIG. 3 is a view showing functional blocks of the control device 30 in the electric power conversion device 100 according to a first exemplary embodiment of the present invention. As shown in FIG. 3, the control device 30 has a voltage control part 34, a current correction part 37 and a switch control part 38.

The voltage control part 34 generates a first gate signal GS1 and a second gate signal GS2 to operate the first drive switch Q1 and the second drive switch Q2, respectively in order to adjust the output voltage Vo4 to an instruction voltage Vo*.

In the first exemplary embodiment, the voltage control part 34 performs a peak current mode control so as to limit a maximum value of each of the first current IL1r, the second current IL2r by using an instruction current IL*. The peak current mode control is a known control method.

A description will now be given of a calculation method of the instruction current IL* to be used in the peak current mode control.

The output voltage sensor 12 transmits the detection result, i.e. the output voltage Vor to a voltage deviation calculation unit 330.

The voltage deviation calculation unit 330 subtracts the output voltage Vor from the instruction voltage Vo* to obtain a voltage deviation. The voltage deviation calculation unit 330 transmits the subtraction result, i.e. the voltage deviation to a proportional integral control unit 331 (PI control unit 331).

The PI control unit 331 calculates a reactor current which is necessary to perform a feedback control of the voltage deviation to zero (the voltage deviation--->0) on the basis of the voltage deviation transmitted from the voltage deviation calculation unit 330.

A limiter 332 limits the calculation value transmitted from the PI control unit 331, and transmits the limited value to a sin θ generation unit 344.

The sin θ generation unit 344 calculates a value of 'sin θ' which shows a phase of the input voltage Vac detected by the input voltage sensor 11. A multiplier 334 multiplies the reactor current transmitted from the limiter 332 with the phase value of 'sin θ' transmitted from the sin θ generation unit 344 to obtain a pre-correction instruction current. An absolute value calculation unit 335 calculates an absolute value of the pre-correction instruction current transmitted from the multiplier 334.

The current correction part 37 calculates a correction value offset to be used for correcting the absolute value of the pre-correction instruction current on the basis of the input voltage Vac and the output voltage Vor. An adder 336 adds the correction value offset to the absolute value of the pre-correction instruction current, and transmits an addition result as an instruction current IL* to a first current control part 35.

A description will now be given of the explanation of the peak current mode control performed by the voltage control part 34.

The voltage control part 34 has the first current control part 35 and a second current control part 36. The first current control part 35 transmits the first gate signal GS1 of the first drive switch Q1. The second current control part 36 transmits the second gate signal GS2 of the second drive switch Q2.

The first current control part 35 has a digital to analogue conversion unit 351 (DA conversion unit 351), a comparator 352, an addition unit 353 and a RS flip flop 357.

The DA conversion unit 351 receives the instruction current IL*. The DA conversion unit 351 converts the received instruction current IL* in a digital form to the instruction current IL* in an analogue form. The DA conversion unit 351 transmits the instruction current IL* in analogue form to an inverting input terminal of the comparator 352. The addition unit 353 adds the first current IL1r detected by the first current sensor 4 with a slope correction signal Slope, and transmits an addition result as a corrected switch current to a non-inverting input terminal of the comparator 352. The slope correction signal Slope is used for suppressing the first current IL1r from oscillating due to variation of a current flowing in the reactor 2.

The comparator 352 compares the instruction current IL* with the corrected switch current. The R terminal of the RS flip flop 357 acquires a low-level signal during a period in which the corrected switch current is smaller than the instruction current IL* on the basis of the comparison result of the comparator 352. The R terminal of the RS flip flop 357 acquires a high-level signal during a period in which the corrected switch current is greater than the instruction current IL* on the basis of the comparison result of the comparator 352.

The R terminal of the RS flip flop 357 receives a clock signal. When the S terminal receives the clock signal of a high level and the R terminal receives the low-level signal, the RS flip flop 357 transmits the output Q of a high level to a first AND circuit 382. On the other hand, when the S terminal receives the clock signal of a low level and the R terminal receives the high-level signal, the RS flip flop 357 transmits the output Q of a low level to the switch control part 38.

Similar to the structure of the first current control part 35, the second current control part 36 has the DA conversion unit 351, the comparator 352, the addition unit 353 and the RS flip flop 357.

The switch control part 38 switches the first gate signal GS1 to be transmitted to the first drive switch Q1 and the second gate signal GS2 to be transmitted to the second drive switch Q2 on the basis of a polarity of the input voltage Vac.

The switch control part 38 has a polarity detection part 381, a first AND circuit 382 and a second AND circuit 383.

When detecting that the input voltage Vac has a positive polarity, the polarity detection part 381 transmits a first selection signal AQ1 of a high level to the first AND circuit 382 so that the first gate signal GS1 is transmitted to the gate of the first drive switch Q1. On the other hand, when detecting that the input voltage Vac has a negative polarity, the polarity detection part 381 transmits a second selection signal AQ2 of a high level to the second AND circuit 383 so that the second gate signal GS2 is transmitted to the gate of the second drive switch Q2.

It is sufficient for the polarity detection part 381 to detect a polarity of the input voltage Vac on the basis of a sign of the input voltage Vac detected by the first voltage sensor 11.

As shown in FIG. 3, the first AND circuit 382 receives the output signal of the RS flip flop 357 in the first current control part 35 and the first selection signal AQ1 transmitted from the polarity detection part 381. The output terminal of the first AND circuit 382 is connected to the gate of the first drive switch Q1 (see FIG. 1).

As shown in FIG. 3, the second AND circuit 383 receives the output signal of the RS flip flop 357 in the second current control part 36 and the second selection signal AQ2 transmitted from the polarity detection part 381. The output terminal of the second AND circuit 383 is connected to the gate of the second drive switch Q2 in the AC-DC converter 10 (see FIG. 1).

When receiving the first selection signal AQ1 of a high level transmitted from the polarity detection part 381 and the output signal of a high level transmitted from the RS flip flop 357 in the first current control part 35, the first AND circuit 382 transmits the first gate signal GS1 of a high level to the gate of the first drive switch Q1. This turns on the first drive switch Q1.

On the other hand, when receiving the second selection signal AQ2 of a high level transmitted from the polarity detection part 381 and the output signal of a high level transmitted from the RS flip flop 357 in the second current control part 36, the second AND circuit 383 transmits the second gate signal GS2 of a high level to the gate of the second drive switch Q2. This turns on the second drive switch Q2.

A description will be given of the operation of the electric power conversion device 100 having the AC-DC converter 10 and the control device 30 for converting an AC power to a DC power with reference to FIG. 4A to FIG. 4H, FIG. 5A to FIG. 5D.

Figure 5A:
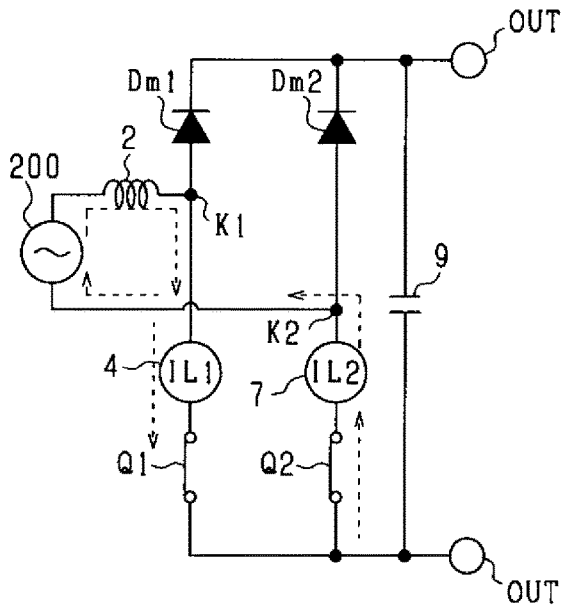
FIG. 5A is a view showing a first current state having a first current flow passage in the AC-DC converter of the electric power conversion device according to the first exemplary embodiment of the present invention.
Figure 5B:
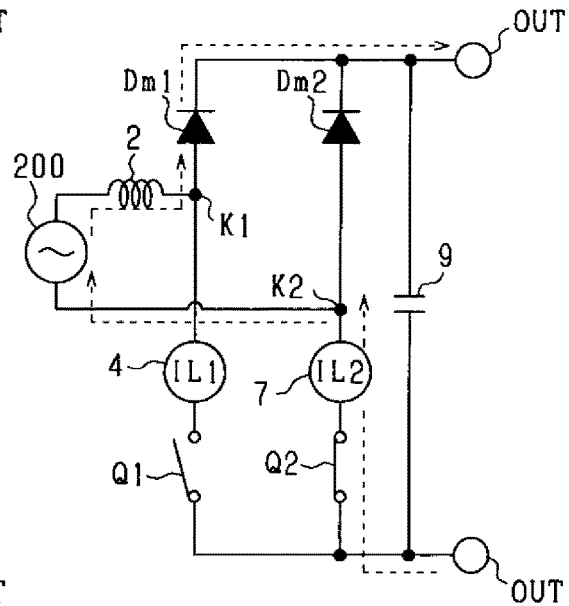
FIG. 5B is a view showing a second current state having a second current flow passage in the AC-DC converter of the electric power conversion device according to the first exemplary embodiment of the present invention.
Figure 5C:
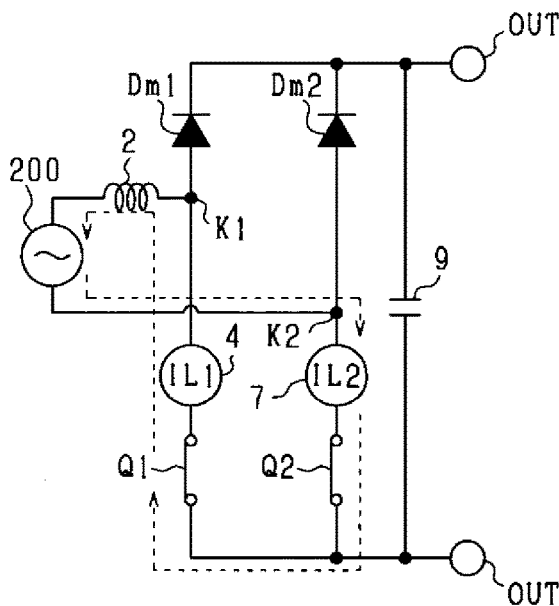
FIG. 5C is a view showing a third current state having a third current flow passage in the AC-DC converter of the electric power conversion device according to the first exemplary embodiment of the present invention.
Figure 5D:
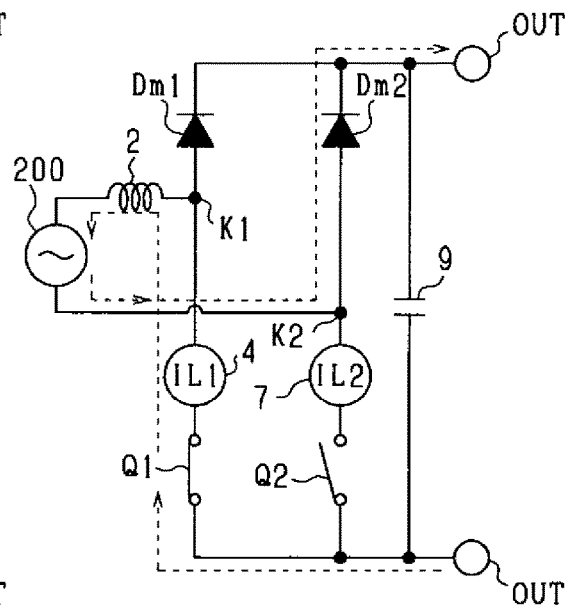
FIG. 5D is a view showing a fourth current state having a fourth current flow passage in the AC-DC converter of the electric power conversion device according to the first exemplary embodiment of the present invention.

FIG. 4A to FIG. 4H show timing charts explaining the operation of the electric power conversion device 100 having the AC-DC converter 10 and the control device 30 according to the first exemplary embodiment of the present invention. FIG. 5A is a view showing a first current state having a first current flow passage in the AC-DC converter 10 of the electric power conversion device 100 according to the first exemplary embodiment. FIG. 5B is a view showing a second current state having a second current flow passage in the AC-DC converter 10 of the electric power conversion device 100 according to the first exemplary embodiment. FIG. 5C is a view showing a third current state having a third current flow passage in the AC-DC converter 10 of the electric power conversion device 100 according to the first exemplary embodiment. FIG. 5D is a view showing a fourth current state having a fourth flow passage in the AC-DC converter 10 of the electric power conversion device 100 according to the first exemplary embodiment.

That is, FIG. 4A shows a transition of the input voltage Vac. FIG. 4B shows a transition of the first selection signal AQ1. FIG. 4C shows a transition of the second selection signal AQ2. FIG. 4D shows a transition of the first switch signal CT1. FIG. 4E shows a transition of the second switch signal CT2. FIG. 4F shows a transition of the first gate signal GS1.

FIG. 4G shows a transition of the second gate signal GS2. FIG. 4H shows a transition of the reactor current IL which flows in the reactor 2. In FIG. 4F, the solid line shows an average value of the reactor current IL.

FIG. 5A and FIG. 5B show the first current flow passage and the second current flow passage, respectively in the SC-DC converter 10 during a first period P1 in which the input voltage Vac has a positive polarity. On the other hand, FIG. 5C and FIG. 5D show the third current flow passage and the fourth current flow passage, respectively in the SC-DC converter 10 during a second period P2 in which the input voltage Vac has a negative polarity.

During the first period P1 in which the input voltage Vac has a positive polarity and the first selection signal AQ1 has a high level, the first drive switch Q1 is turned on and off on the basis of the value of the first gate signal GS1. During this condition, the current always flows in the body diode of the second drive switch Q2.

In the first current flow passage shown in FIG. 5A during the first period P1, the first drive switch Q1 is turned on when the first gate signal GS1 has a high level. In this condition, because the current flows in the first current flow passage (see FIG. 5A) formed by the AC power source 200, the reactor 2, the first drive switch Q1 and the second drive switch Q2, magnetic energy is charged in the reactor 2.

In the second current flow passage shown in FIG. 5B during the first period P1, the first drive switch Q1 is turned off when the first gate signal GS1 has a low level. In this condition, the current flows in the second current flow passage (see FIG. 5B) from the reactor 2 to the output terminal OUT through the first main diode Dm1.

During the second period P2 in which the input voltage Vac has a negative polarity, i.e. the AC power source 200 provides the voltage of a negative polarity, and the second selection signal AQ2 has a high level, the second drive switch Q2 is turned on and off on the basis of the value of the second gate signal GS2. During this condition, the current always flows in the body diode of the first drive switch Q1.

In the third current flow passage shown in FIG. 5C during the second period P2, the second drive switch Q2 is turned on when the second gate signal GS2 has a high level. In this condition, because the current flows in the third current flow passage (see FIG. 5C) formed by the AC power source 200, the second drive switch Q2, the first drive switch Q1 and the reactor 2, magnetic energy is charged in the reactor 2.

In the fourth current flow passage shown in FIG. 5D during the second period P2, the second drive switch Q2 is turned off when the second gate signal GS2 has a low level. In this condition, the current flows in the fourth current flow passage (see FIG. 5D) from the reactor 2 to the output terminal OUT through the second main diode Dm2.

In the structure of the electric power conversion device 100 according to the first exemplary embodiment, the current flows in the direction toward the first drive switch Q1 from the first connection node K1 during the first current state having the first current flow passage shown in FIG. 5A in which the input voltage Vac has a positive polarity. Accordingly, the first current sensor 4 detects a positive value of the first current IL1$r$. Further, in the first current state and the second current state shown in FIG. 5A and FIG. 5B, respectively the current flows in the direction from the second drive switch Q2 to the second connection node K2. Accordingly, the second current sensor 7 detects a negative value of the second current IL2r.

In the structure of the electric power conversion device 100 according to the first exemplary embodiment, the current flows in the direction from the first drive switch Q1 to the first connection node K1 during the third current state having the third current flow passage shown in FIG. 5C and the fourth current state having the fourth current flow passage shown in FIG. 5D in which the input voltage Vac has a negative polarity. Accordingly, the first current sensor 4 detects a negative value of the first current IL1r. Further, in the third current state shown in FIG. 5C the current flows in the direction from the second connection node K2 to the second drive switch Q2. Accordingly, the second current sensor 7 detects a positive value of the second current IL2r.

Figure 6A:
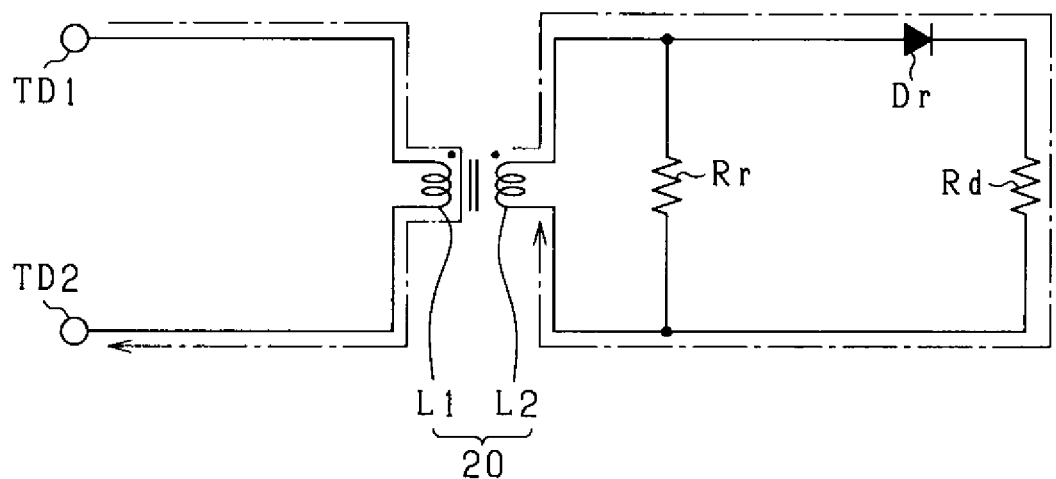
FIG. 6A and FIG. 6B are views showing circuit structures of a comparison example so as to explain the operation principal of the electric power conversion device according to the first exemplary embodiment of the present invention.
Figure 6B:
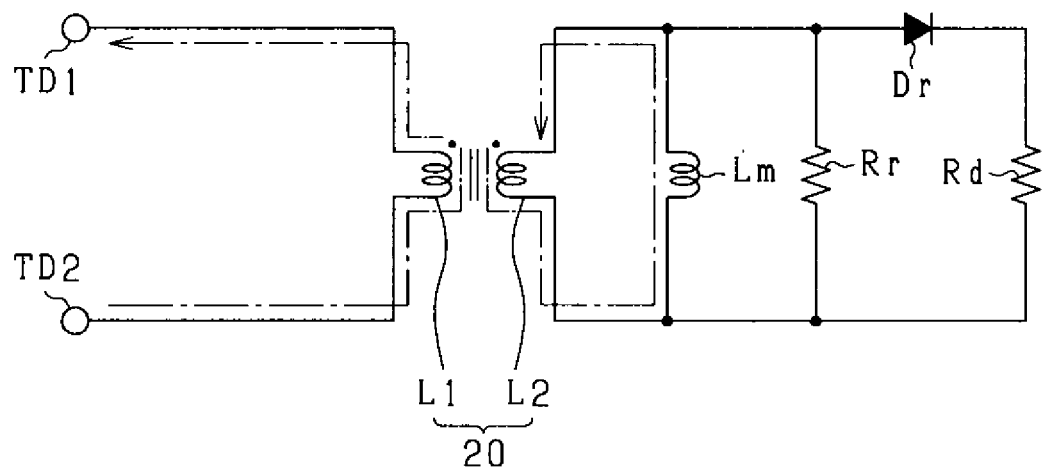

FIG. 6A and FIG. 6B are views showing circuit structures of a comparison example so as to explain the operation principal of the electric power conversion device 100 according to the first exemplary embodiment of the present invention.

That is, FIG. 6A and FIG. 6B show the circuit structure of the comparison example without the first switch SW1 and the second switch SW2. FIG. 6A shows a current state in which the current flows in a current sensor in the comparison example when the input voltage Vac has a positive polarity. FIG. 6B shows a current state in which the current flows in the current sensor in the comparison example when the input voltage Vac has a negative polarity.

As shown in FIG. 6A, when a positive current flows in the primary coil L1, the current, a magnitude of which corresponds to a turn number ratio Nr of the primary coil L1 and the secondary coil 12, flows to the anode of the rectifier diode Dr, and the current flows in the detection resistance Rd through the rectifier diode Dr, and a voltage drop occurs. A part of the current flowing in the secondary coil L2 flows in the excitation inductance to excite the current transformer 20, the current flows in the excitation inductance is less than the current flowing in the detection resistance Rd.

On the other hand, as shown in FIG. 6B, when a negative current flows in the primary coil L1, the current, a magnitude of which corresponds to the turn number ratio Nr of the primary coil L1 and the secondary coil 12, flows from the second detection terminal TD2. Because the first terminal of the detection resistance Rd is connected to the cathode of the rectifier diode Dr, the current flows into the excitation inductance Lm without flowing in the detection resistance Rd.

The current flows in the excitation inductance Lm which is higher than that when the positive current flows in the primary coil L1. This makes it possible to increase a magnetic flux of the current transformer 20.

As can be explained in the case shown in FIG. 6A and FIG. 6B, previously described, the first current transformer 21 and the second current transformer 22, when the negative current flows in the first current transformer 21 and the second current transformer 22, have a magnetic flux density which is higher than that when the positive current flows in the first current transformer 21 and the second current transformer 22.

Accordingly, for example, each of the first current transformer 21 and the second current transformer 22 has an impedance which is smaller than that when magnetic saturation occurs in the first current transformer 21 and the second current transformer 22, and there is a possible case in which an excess current flows in the first current sensor 4 and the second current sensor 7.

Further, because a residual magnetic field remains in the first current transformer 21 and the second current transformer 22 when the polarity of the input voltage Vac is switched from the negative polarity to the positive polarity, and the voltage drop generated in the first detection resistance Rd1 and the second detection resistance Rd2 has a value which does not correspond to the current flowing in each of the primary coil L1a and the secondary coil Lib. Accordingly, this would cause a current detection error generated in each of the first current sensor 4 and the second current sensor 7.

In the electric power conversion device 100 according to the first exemplary embodiment, the first detection sensor 4 in the AC-DC converter 10 is equipped with the first switch SW1 and the second detection sensor 7 is equipped with the second switch SW2 so as to avoid such a current detection error. The presence of the first switch SW1 suppresses the magnetic flux in the primary transformer 21 from increasing. The presence of the second switch SW2 suppresses the magnetic flux in the secondary transformer 22 from increasing, In addition, the switch control part 38 in the control device 30 in the electric power conversion device 100 generates and transmits the first switch signal CT1 and the second switch signal CT2 based on the polarity of the input voltage Vac. The first switch SW1 is turned on and off on the basis of the first switch signal CT1. The second switch SW2 is turned on and off on the basis of the second switch signal CT2.

Specifically, as shown in FIG. 4D, during the first period P1 in which the input voltage Vac has a positive polarity, the switch control part 38 transmits the second switch signal CT2 of a high level so as to turn on the second switch SW2 in the second current sensor 7.

Further, as shown in FIG. 4E, during the second period P2 in which the input voltage Vac has a negative polarity, the switch control part 38 transmits the first switch signal CT1 of a high level so as to turn on the first switch SW1 in the first current sensor 4.

When the first switch SW1 is turned on and the second switch SW2 is turned on, a current path of a low impedance is formed between the secondary coil L2a in the first current sensor 4 and the secondary coil L2b in the second current sensor 7 and the second detection resistance Rd1 in the first current sensor 4 and the second detection resistance Rd2 in the second current sensor 7. Accordingly, the current from the second terminal of each of the secondary coils L2a, L2b into the second terminal of each of the secondary coils L2a, L2b through the current path of a low impedance generated by the turned-on first switch Sw1 and the turned-on second switch SW2. This reduces the excitation current flowing in the excitation inductance Lm, and makes it possible to suppress the magnetic flux of the first current transformer 21 (see FIG. 2A) and the second current transformer 22 (see FIG. 2B) from increasing.

Further, it is possible to reduce the impedance of the current path formed by the first switch SW1 and the second switch SW2 when the first switch SW1 is arranged in the secondary side in the first current sensor 4 and the second switch SW2 is arranged in the secondary side in the second current sensor 7 when compared with a structure in which the first switch Sw is arranged at the primary side of the first current transformer 21 in the first current sensor 4 and the second switch SW2 is arranged in the primary side of the second current transformer 22 in the second current sensor 7.

It is possible to calculate the impedance Z2 of the current path formed by the first switch arranged at the secondary side of the first current transformer 21 and the second switch SW2 arranged at the secondary side of the second current transformer 22.

$$Z2 = Z1/Nr^2, \quad (2)$$

where Z1 indicates an impedance when the current path is formed at the primary side of the first current transformer 21 and the second current transformer 22, and Z2 indicates an impedance when the current path is formed at the secondary side of the first current transformer 21 and the second current transformer 22. For example, the impedance Z1 is a turn-on resistance when the first switch SW1 and the second switch SW2 are turned on.

The arrangement of the first switch SW1 and the second switch SW2 at the secondary side of the first current transformer 21 and the second current transformer 22 makes it possible to reduce the impedance Z2 of the current path when compared with the arrangement of the first switch SW1 and the second switch SW2 at the primary side of the first current transformer 21 and the second current transformer 22. This makes it possible to allow the current to easily flow in the current path formed by the first switch SW1 and the second switch SW2, and to reduce a magnitude of the excitation current flowing in the first current transformer 21 in the first current sensor 4 and the second current transformer 22 in the second current sensor 7.

Next, a description will be given of the control operation of the output voltage Vo performed by the control device 30 with reference to FIG. 7.

Figure 7:
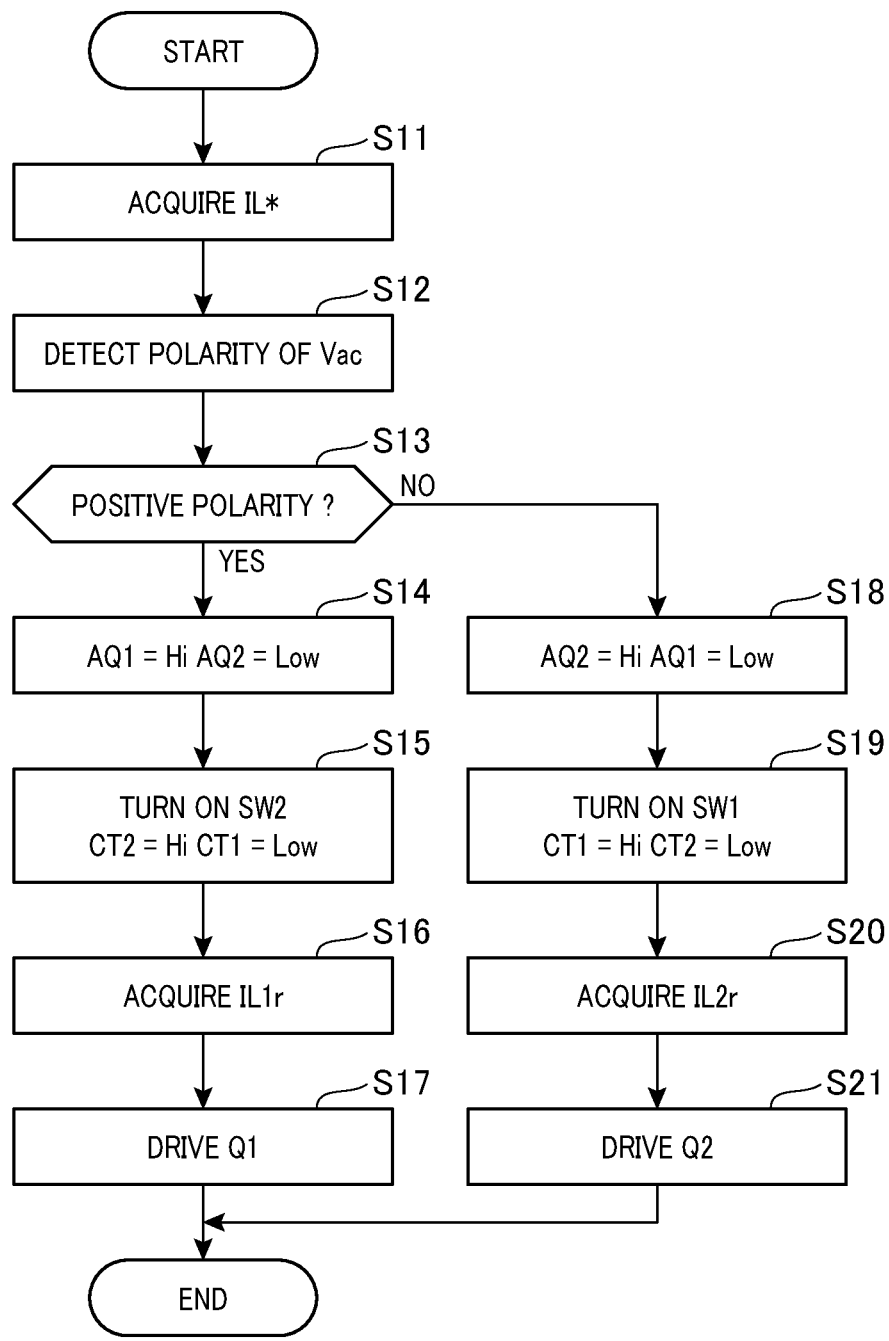
FIG. 7 is a flow chart of a control operation of an output voltage V0 performed by the control device in the electric power conversion device according to the first exemplary embodiment of the present invention.

FIG. 7 is a flow chart of the control operation of the output voltage V0 performed by the control device 30 in the electric power conversion device 100 according to the first exemplary embodiment of the present invention.

The control device 30 repeatedly performs the control operation of the output voltage V0 indicated by the flow chart shown in FIG. 7.

In step S11 shown in FIG. 7, the control device 30 acquires the instruction current IL* on the basis of the instruction voltage Vo* and the output voltage Vor. The operation flow progresses to step S12.

In step S12, the control device 30 detects the polarity of the input voltage Vac. The operation flow progresses to step S13.

In step S13, when the input voltage Vac has a positive polarity, the operation flow progresses to step S14.

In step S14, the control device 30 generates the first selection signal AQ1 of a high level so as to turn on the first drive switch Q1. The control device 30 maintains a low level of the second selection signal AQ2. The operation flow progresses to step S15.

In step S15, the control device 30 generates the second switch signal CT2 of a high level so as to turn on the second drive switch Q2 in the second current sensor 7. The control device 30 maintains a low level of the first switch signal CT1. This makes it possible to suppress the magnetic flux of the second current transformer 22 in the second current sensor 7 from increasing because the second switch SW2 is turned on. The operation flow progresses to step S16.

In step S16, the control device 30 acquires the first current IL1r detected by and transmitted form the first current sensor 4. The operation flow progresses to step S17.

In step S17, the first drive switch Q1 is turned on and off based on the first gate signal GS1. At this time, the control device 30 performs the peak current mode control so as to determine a duty of the first gate signal GS1 so that the upper-limit value of the first current IL1r does not exceed the instruction current IL* obtained in step S11.

When the detection result in step S13 indicates that the input voltage Vac is a negative polarity, the operation flow progresses to step S18.

In step S18, the control device 30 generates the second selection signal AQ2 of a high level so as to drive the second drive switch Q2. The control device 30 maintains a low level of the first selection signal AQ1. The operation flow progresses to step S19.

In step S19, the control device 30 generates the first switch signal CT1 of a high level so as to turn on the first switch SW1 in the first current sensor 4. The control device 30 maintains a low level of the second switch signal CT2. Because the first switch SW1 is turned on, it is possible to suppress the magnetic flux of the first current transformer 21 from increasing. The operation flow progresses to step S20.

In step S20, the control device 30 acquires the second current IL2r detected by the second current sensor 7. The operation flow progresses to step S21.

In step S21, the second drive switch Q2 is driven on the basis of the second gate signal GS2. At this time, the control device 30 performs the peak current mode control so as to determine a duty of the second gate signal GS2 so that the upper-limit value of the second current IL2r does not exceed the instruction current IL* obtained in step S11. When the process in step S17 or step S21 has been finished, the control device 30 finishes the control operation of the output voltage V0 (see the flow chart shown in FIG. 7).

A description will be given of the effects of the electric power conversion device 100 having the AC-DC converter 10 according to the first exemplary embodiment with reference to FIG. 8A, FIG. 8B and FIG. 8C.

FIG. 8A is a view showing a transition of the input current Iac flowing in the input terminal IN. FIG. 8B is a view showing a transition of the excitation current flowing in the second current transformer 22 in the second current sensor 7 of the AC-DC converter 10. FIG. 8C is a view showing a transition of the excitation voltage of the second current transformer 22 in the second current sensor 7 of the AC-DC converter 10.

FIG. 9A is a view showing a transition of the input current Iac flowing in the input terminal IN in a comparative example without the second switch SW2. FIG. 9B is a view showing a transition of the excitation current flowing in the second current transformer 22 in the comparative example without the second switch SW2. FIG. 9C is a view showing a transition of the excitation voltage of the second current transformer 22 in the comparative example without the second switch SW2.

In the comparative example shown in FIG. 9B, the magnitude of the excitation voltage drastically increases at the negative side and the second current transformer 22 is excited during the first period P1.

Accordingly, as shown in FIG. 9C, a negative excited voltage is generated in the second current transformer 22 during the first period P1.

On the other hand, in the improved structure of the AC-DC converter 10 of the electric power conversion device 100 according to the first exemplary embodiment, because the second switch signal CT2 has a high level, the second switch SW2 in the second current sensor 7 is turned on during the first period P1. As shown in FIG. 8B, an absolute value of the excitation current becomes smaller than the value shown in the comparative example during the first period P1. Accordingly, the magnetic flux density in the second current transformer 22 of the second current sensor 7 is smaller than that in the comparative example. As shown in FIG. 8C, the absolute value of the excitation voltage in the second current transformer 22 becomes lower than that of the comparative example during the first period P1.

The electric power conversion device 100 according to the first exemplary embodiment has the following effects.

The control device 30 instructs the second switch SW2 in the second current sensor 7 to be turned on during the first period P1. This control makes it possible to suppress the excitation current from flowing in the second current transformer 22 in the second current sensor 7 and to suppress the magnetic flux from increasing in the second current transformer 22. This control makes it possible to suppress thermal energy from being generated in the first current sensor 4 of a CT type and the second current sensor 7 of a CT type in the AC-DC converter 10. This control makes it possible to further reduce the current detection error.

In the improved structure of the AC-DC converter 10 of the electric power conversion device 100 according to the first exemplary embodiment, the first switch SW1 and the second switch SW2 are arranged at the secondary side in the first current sensor 4 and the second current sensor 7, respectively. This arrangement makes it possible to reduce the impedance of the current path generated by turning on the first switch SW1 and the second switch SW2, and to suppress the excitation current from flowing in the first current transformer 21 in the first current sensor 4 and the second current transformer 22 in the second current sensor 7. The arrangement of the first switch SW1 and the second switch SW2 at the secondary side of the transformer in the first current sensor 4 and the second current sensor 7, respectively reduces the impedance when compared with the arrangement of the first switch SW1 and the second switch SW2 at the primary side of the transformer. This makes it possible to avoid high impedance switches as the first switch SW1 and the second switch SW2.

This makes it possible to reduce a manufacturing cost of the AC-DC converter 10 in the electric power conversion device 100 according to the first exemplary embodiment.

(First Modification of the First Exemplary Embodiment)

A description will be given of the first current sensor 4 and the second current sensor 7 in the AC-DC controller 10 of the electric power conversion device 100 according to a first modification of the first exemplary embodiment with reference to FIG. 10A and FIG. 10B.

Figure 10A:
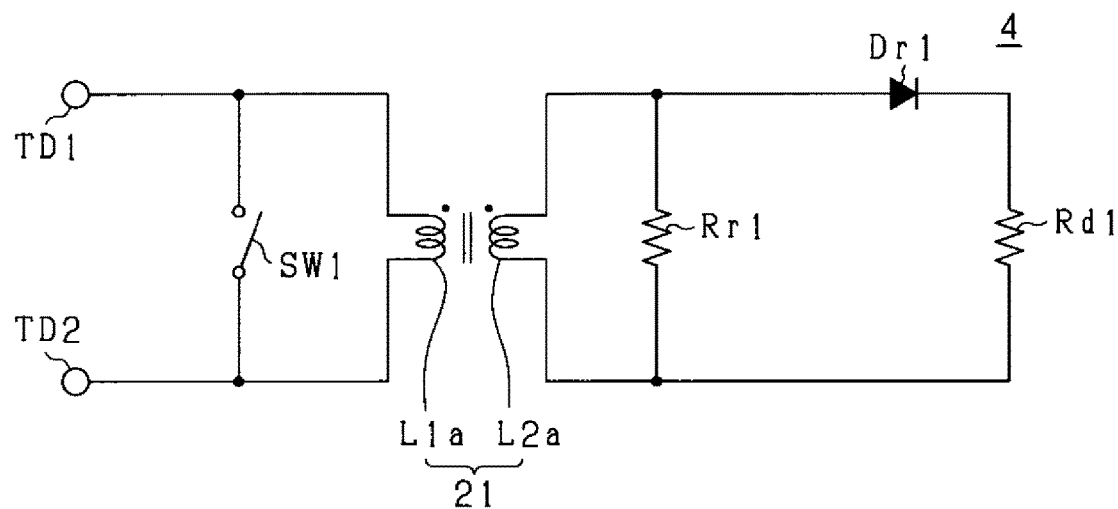
FIG. 10A is a view showing a circuit structure of the first current sensor in the AC-DC converter of the electric power conversion device according to a first modification of the first exemplary embodiment.

FIG. 10A is a view showing a circuit structure of the first current sensor 4 in the AC-DC converter 10 of the electric power conversion device 100 according to the first modification of the first exemplary embodiment. FIG. 10B is a view showing a circuit structure of the second current sensor 7 in the AC-DC converter 10 of the electric power conversion device 100 according the first modification of the first exemplary embodiment.

As shown in FIG. 10A, it is acceptable to arrange the first switch SW1 at the primary side of the first current transformer 21 in the first current sensor 4. Further, as shown in FIG. 10B, it is acceptable to arrange the second switch SW2 at the primary side of the second current transformer 22 in the second current sensor 7.

In the structure shown in FIG. 10A, the first switch SW1 is arranged at the primary side of the first current transformer 21 and connected parallel with the primary side coil L1a of the first current transformer 21. Similarly, in the structure shown in FIG. 10B, the second switch SW2 is arranged at the primary side of the second current transformer 22 and connected parallel with the primary side coil L1b of the second current transformer 22.

During the first period P1, when the second switch SW2 is turned on, the current flows from the fourth detection terminal TD4 to the third detection terminal TD3 through the current path formed by the turned-on second switch SW2. Further, during the second period P2, when the first switch SW1 is turned on, the current flows from the second detection terminal TD2 to the first detection terminal TD1 through the current path formed by the turned-on first switch SW1. Accordingly, this control makes it possible to reduce the current flowing in the primary side coil L1a in the first current transformer 21, and the current flowing in the primary side coil L1b in the second current transformer 22. This makes it possible to reduce the excitation current, and suppress the magnetic flux from increasing in the first current transformer 21 and the second current transformer 22.

Figure 10B:
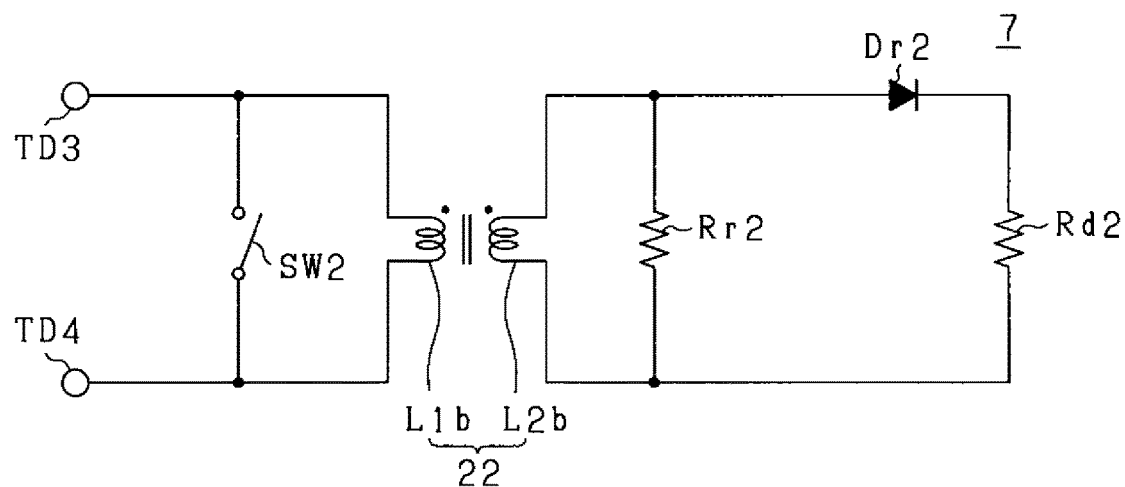
FIG. 10B is a view showing a circuit structure of the second current sensor in the AC-DC converter of the electric power conversion device according to the first modification of the first exemplary embodiment.

As previously described, it is possible for the first modification of the first current sensor 4 and the second current sensor 7 in the AC-DC converter 10 shown in FIG. 10A and FIG. 10B to have the same effects provided by the first exemplary embodiment.

(Second Modification of the First Exemplary Embodiment)

Figure 11:
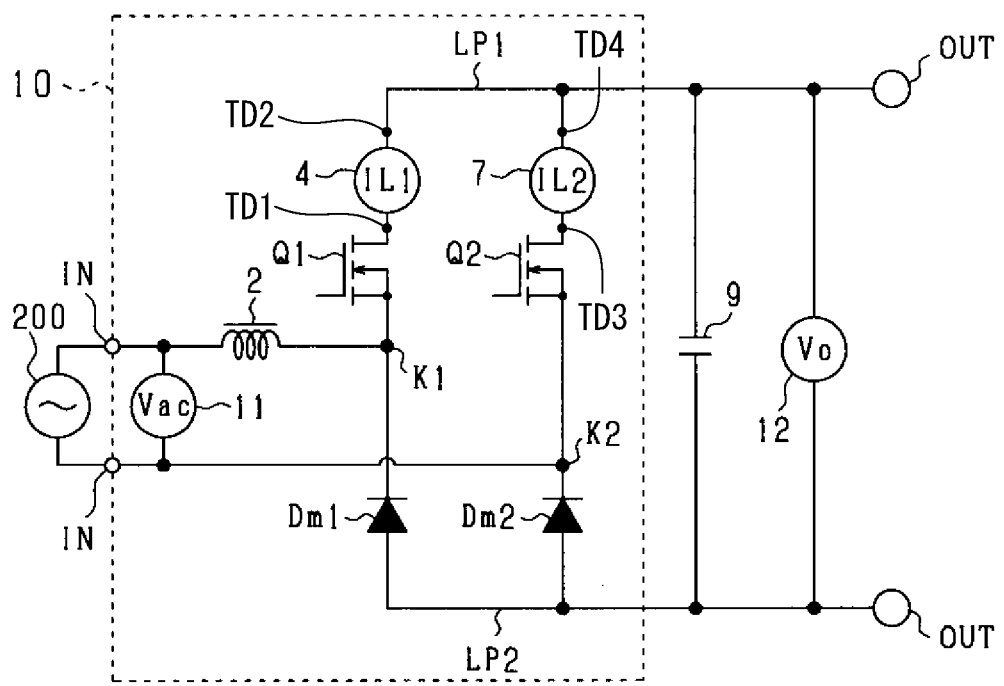
FIG. 11 is a view showing a structure of the electric power conversion device according to a second modification of the first exemplary embodiment.

A description will be given of the AC-DC converter 10 of the electric power conversion device 100 according to a second modification of the first exemplary embodiment with reference to FIG. 11. FIG. 11 is a view showing a structure of the electric power conversion device 100 according to the second modification of the first exemplary embodiment.

In the structure of the AC-DC converter 10 shown in FIG. 11, the series connection unit is composed of the first main diode Dm1 and the first drive switch Q1, and the series connection unit is composed of the second main diode Dm2 and the second drive switch Q2. In more detail, the cathode of the first main diode Dm1 is connected to the source of the first drive switch Q1, and the cathode of the second main diode Dm2 is connected to the source of the second drive switch Q2. The drain of the first drive switch Q1 and the drain of the second drive switch Q2 are connected respectively to the first line LP1. The anode of the first main diode Dm1 and the anode of the second main diode Dm2 are connected respectively to the second line LP2.

In the structure shown in FIG. 11, the first current sensor 4 is connected between the drain of the first drive switch Q1 and the first line Lp1. Specifically, the first detection terminal TD1 of the first current sensor 4 is connected to the drain of the first drive switch Q1, and the second detection terminal TD2 of the first current sensor 4 is connected to the first line Lp1. Further, the second current sensor 7 is connected between the drain of the second drive switch Q2 and the second line Lp2. Specifically, the third detection terminal TD3 of the second current sensor 7 is connected to the drain of the second drive switch Q2, and the fourth detection terminal TD4 of the second current sensor 7 is connected to the second line Lp2.

In the AC-DC converter 10 according to the second modification of the first exemplary embodiment, during the first period P1, the AC-DC control device 30 turns on/off the second drive switch Q2, and maintains a turned-off state of the first drive switch Q1.

During the second period P2, the AC-DC control device 30 turns on/off the first drive switch Q1, and maintains a turned-off state of the second drive switch Q2.

As previously described, the AC-DC converter 10 having the structure according to the second modification of the first exemplary embodiment shown in FIG. 11 has the same as the AC-DC converter 10 according to the first exemplary embodiment.

(Third Modification of the First Exemplary Embodiment)

A description will be given of the control device 30 of the electric power conversion device 100 according to a third modification of the first exemplary embodiment with reference to FIG. 12. It is acceptable for the control device 30 to have one current control part instead of using the first current control part 35 and the second current control part 36, and for the switch control part 38 to switch the first gate signal GS1 and the second gate signal GS2.

Figure 12:
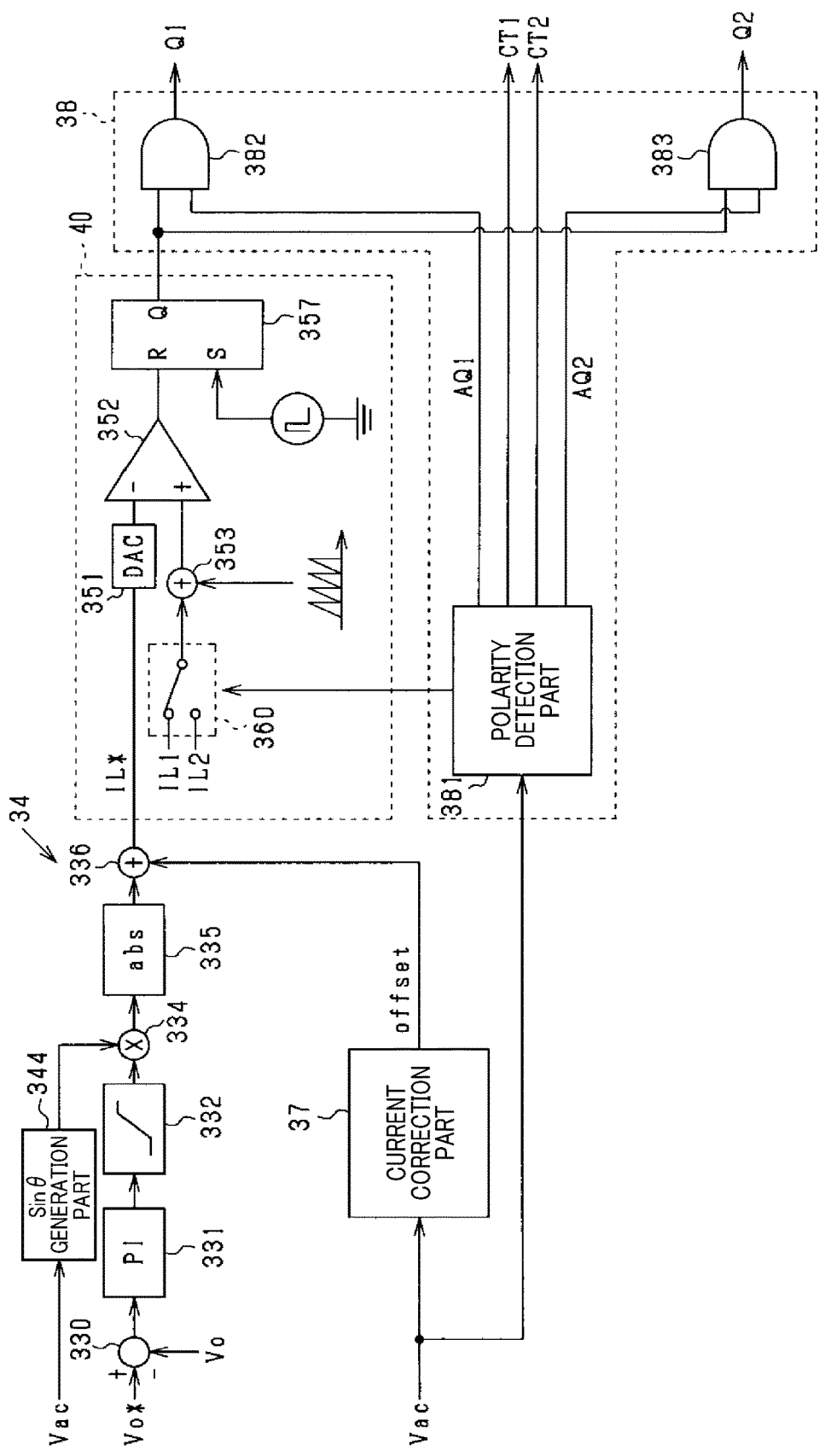
FIG. 12 is a view showing functional blocks of the control device in the electric power conversion device according to a third modification of the first exemplary embodiment.

FIG. 12 is a view showing functional blocks of the control device 30 of the electric power conversion device 100 according to the third modification of the first exemplary embodiment.

In the structure of the control device 30 shown in FIG. 12, a third current control part 40 has a current switch part 360 capable of selecting one of the first current IL1r and the second current IL2r on the basis of the input voltage Vac, and transmitting the selected current to the addition unit 353.

When the input voltage Vac has a positive polarity, the polarity detection part 381 of the switch control part 38 instructs the current switch part 360 so as for the addition unit 353 to transmit the first current IL1r.

On the other hand, when the input voltage Vac has a negative polarity, the polarity detection part 381 of the switch control part 38 instructs the current switch part 360 so as for the addition unit 353 to transmit the second current IL2r.

The addition unit 353 adds one of the first current IL1r and the second current IL2r transmitted from the current switch part 360 with the slope correction signal Slope, and transmits the addition result as the corrected switch current to the comparator 352.

As previously described, the control device 30 having the structure according to the third modification of the first exemplary embodiment shown in FIG. 12 has the same as the control device of the AC-DC converter 10 according to the first exemplary embodiment.

Second Exemplary Embodiment

A description will be given of the electric power conversion device 100 having the control device 10 according to a second first exemplary embodiment with reference to FIG. 13A, FIG. 13B and FIG. 14A to FIG. 14H.

A difference in structure and behavior between the second exemplary embodiment and the first exemplary embodiment will be explained. Explanation of the identical components between the second exemplary embodiment and the first exemplary embodiment is omitted here for brevity.

Figure 13A:
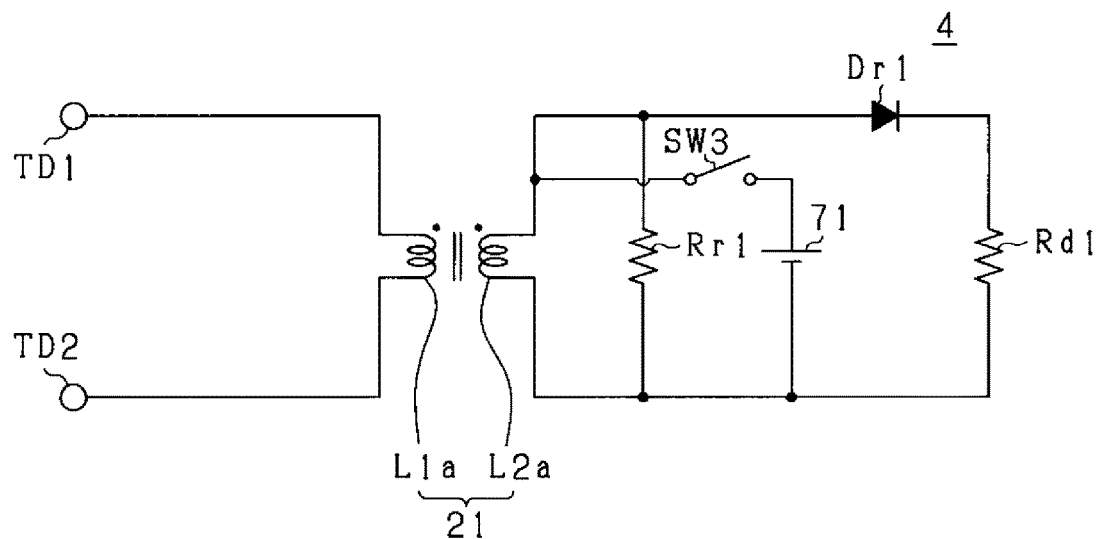
FIG. 13A is a view showing a circuit structure of the first current sensor in the electric power conversion device according to a second first exemplary embodiment of the present invention.
Figure 13B:
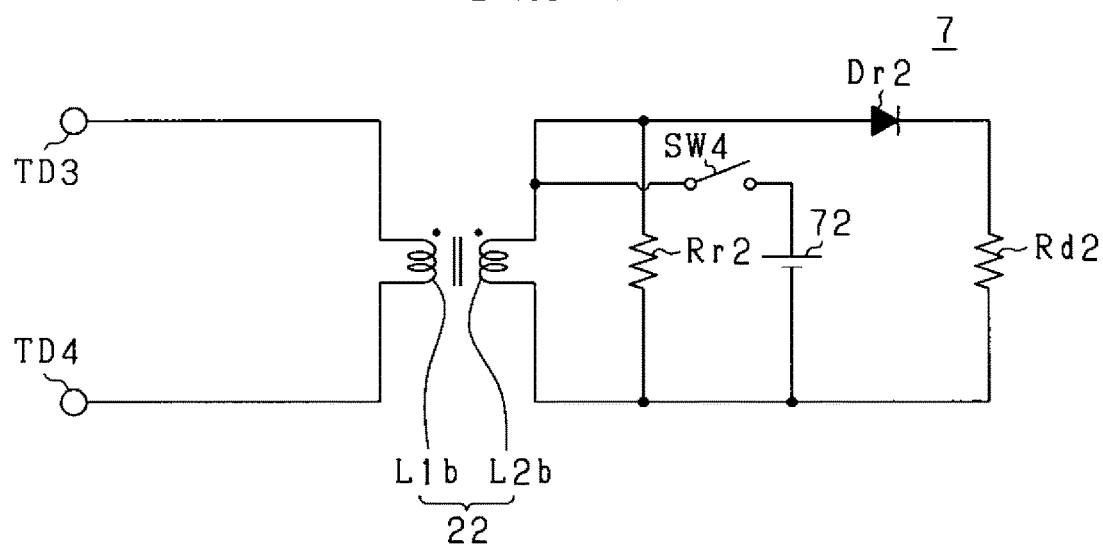
FIG. 13B is a view showing a circuit structure of the second current sensor in the electric power conversion device according to the second exemplary embodiment of the present invention.

As shown in FIG. 13A and FIG. 13B, the first current sensor 4 and the second current sensor 7 in the AC-DC converter 10 according to the second exemplary embodiment have the structure to prevent the excitation current from flowing in the first current transformer 21 and the second current transformer 22, respectively.

FIG. 13A is a view showing a circuit structure of the first current sensor 4 in the AC-DC converter 10 of the electric power conversion device 100 according to a second first exemplary embodiment. FIG. 13B is a view showing a circuit structure of the second current sensor 7 in the AC-DC converter 10 of the electric power conversion device 100 according to the second exemplary embodiment.

The secondary coil L2a in the first current sensor 4 has a third detection switch SW3 (hereinafter the third switch SW3) and a first current power source 71. A first terminal of the third switch SW3 is connected to the first terminal of the secondary coil L2a, and a second terminal of the third switch SW3 is connected to a positive-side terminal of the first current power source 71. A negative-side terminal of the first current power source 71 is connected to the second terminal of the secondary coil L2a in the first current transformer 21.

The secondary coil L2b in the second current sensor 7 has a fourth detection switch SW4 (hereinafter the fourth switch SW4) and a second current power source 72. A first terminal of the fourth switch SW4 is connected to the first terminal of the secondary coil L2b, and a second terminal of the fourth switch SW4 is connected to a positive-side terminal of the second current power source 72. A negative-side terminal of the second current power source 72 is connected to the second terminal of the secondary coil L2b in the second current transformer 22.

When the third switch SW3 in the first current sensor 4 is turned on, a direct current voltage (DC voltage) of the first current power source 71 is supplied to the secondary coil L2a of the first current transformer 21. Accordingly, a negative current flows in the primary coil L1a of the first current transformer 21, and a magnetic flux generated in the first current transformer 21 is eliminated by the DC voltage supplied from the first current power source 71.

Further, when the fourth switch SW4 in the second current sensor 7 is turned on, a direct current voltage (DC voltage) of the second current power source 72 is supplied to the secondary coil L2b of the second current transformer 22. Accordingly, a negative current flows in the primary coil L1b of the second current transformer 22, a magnetic flux generated in the second current transformer 22 is eliminated by the DC voltage supplied from the second current power source 72.

FIG. 14A to FIG. 14H are timing charts explaining the operation of the electric power conversion device 100 having the AC-DC converter 10 and the control device 30 according to the second exemplary embodiment of the present invention.

FIG. 14A shows a transition of the input voltage Vac. FIG. 14B shows a transition of the first selection signal AQ1. FIG. 14C shows a transition of the second selection signal AQ2. FIG. 14D shows a transition of the first switch signal CT1. FIG. 14E shows a transition of the second switch signal CT2. FIG. 14F shows a transition of the first gate signal GS1. FIG. 14G shows a transition of the second gate signal GS2. FIG. 14H shows a transition of the reactor current IL which flows in the reactor 2. In FIG. 14F, the solid line shows an average value of the reactor current IL.

During the first period P1 in which the input voltage Vac has a positive polarity, the control device 30 generates the first selection signal AQ1 of a high level. Accordingly, the first drive switch Q1 is turned on/off on the basis of the high level/low level of the first gate signal GS1 transmitted from the control device 30. The control device 30 temporarily generates the second switch signal CT2 of a high level at a timing immediately before the input voltage Vac is switched from a positive polarity to a negative polarity. Accordingly, a DC voltage, supplied from the second current power source 72, is supplied to the secondary side coil L2b in the second current sensor 7 so as to eliminate the magnetic flux in the second current transformer 22.

During the second period P2 in which the input voltage Vac has a negative polarity, the control device 30 generates the second selection signal AQ2 of a high level. Accordingly, the second drive switch Q2 is turned on/off on the basis of the high level/low level of the second gate signal GS2 transmitted from the control device 30. The control device 30 temporarily generates the first switch signal CT1 of a high level at a timing immediately before the input voltage Vac is switched from a negative polarity to a positive polarity. Accordingly, a DC voltage, supplied from the first current power source 71, is supplied to the secondary side coil L2a in the first current sensor 4 so as to eliminate the magnetic flux in the first current transformer 21.

As previously described, the electric power conversion device 100 having the structure according to the second exemplary embodiment shown in FIG. 13A and FIG. 13B has the same as the electric power conversion device 100 according to the first exemplary embodiment.

(Modification of the Second Exemplary Embodiment)

A description will be given of the first current sensor 4 and the second current sensor 7 in the AC-DC controller 10 of the electric power conversion device 100 according to a modification of the second exemplary embodiment with reference to FIG. 15A and FIG. 15B.

It is possible for the electric power conversion device 100 to have a structure, capable of suppressing the excitation current from flowing in the first current transformer 21 and the second current transformer 22, in which an auxiliary coil L3a is arranged in the first current transformer 21 and an auxiliary coil L3b is arranged in the second current transformer 22.

Figure 15A:
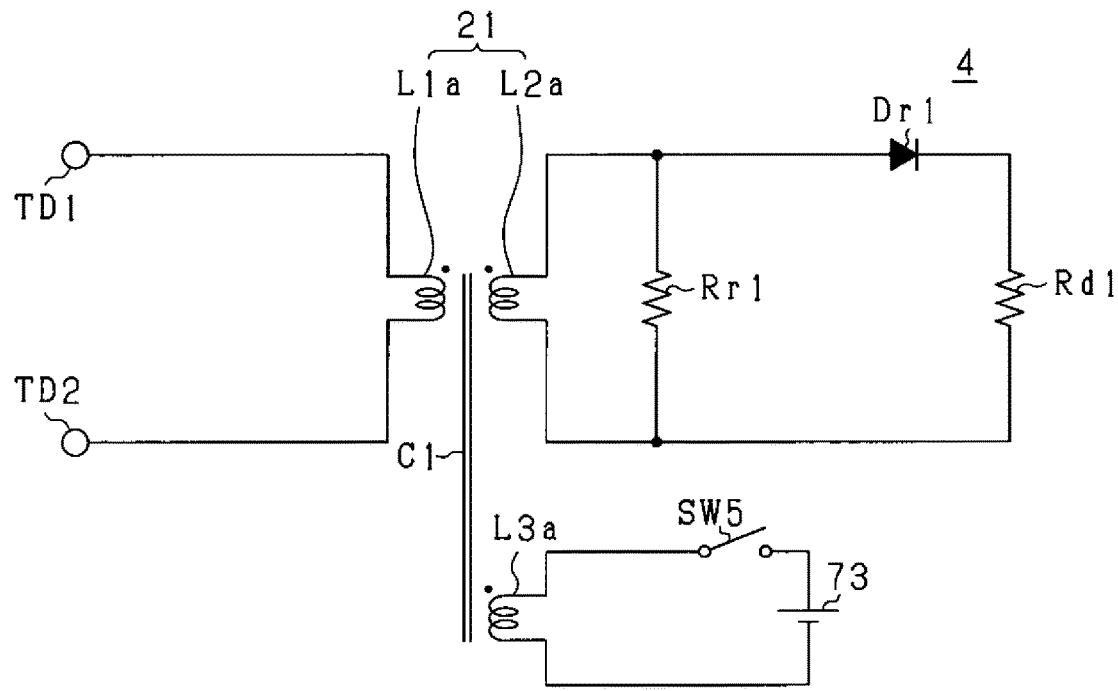
FIG. 15A is a view showing a circuit structure of a modification of the first current sensor in the electric power conversion device according to the second exemplary embodiment of the present invention.
Figure 15B:
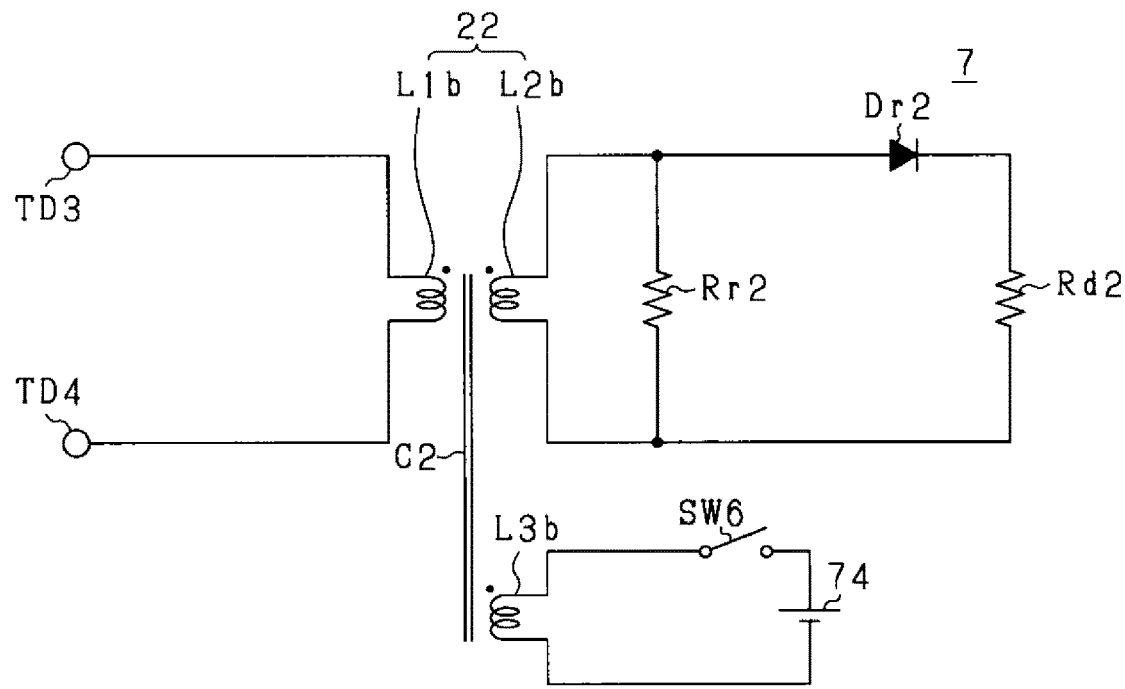
FIG. 15B is a view showing a circuit structure of a modification of the second current sensor in the electric power conversion device according to the second exemplary embodiment of the present invention.

FIG. 15A is a view showing a circuit structure of the modification of the first current sensor 4 in the AC-DC converter 10 of the electric power conversion device according to the second exemplary embodiment. FIG. 15B is a view showing a circuit structure of the modification of the second current sensor 7 in the AC-DC converter of the electric power conversion device according to the second exemplary embodiment.

As shown in FIG. 15A, the primary coil L1a, the secondary coil L2a and an auxiliary coil L3a in the first current sensor 4 have a first common core C1. As shown in FIG. 15B, the primary coil L1b, the secondary coil L2b and an auxiliary coil L3b in the second current sensor 7 have a second common core C2.

Further, a voltage having an inverted polarity which is inverted from the polarity of the voltage supplied to the primary coil L1a, the secondary coil L2a in the first current sensor 4. A voltage having an inverted polarity which is inverted from the polarity of the voltage supplied to the primary coil L1b, the secondary coil L2b in the second current sensor 7.

In the structure of the modification of the second exemplary embodiment shown in FIG. 15A, the first current sensor 4 has the first current transformer 21 having the primary coil L1a and the secondary coil L2a, the auxiliary coil L3a, a third electric power source 73 and a fifth detection switch SW5 (hereinafter the fifth switch SW5). In the first current sensor 4, the primary coil L1a, the secondary coil L2a and the auxiliary coil L3a have the first common core C1. In the second current sensor 7, the primary coil L1b, the secondary coil L2b and the auxiliary coil L3b have the second common core C2. The fifth switch SW5 allows and prohibits the DC power supply from the third electric power source 73 to the auxiliary coil L3a.

In the first current transformer 21, the auxiliary coil L3a and the secondary coil L2a have the same winding direction.

Similarly, in the structure of the modification of the second exemplary embodiment shown in FIG. 15B, the second current sensor 7 has the second current transformer 22 having the primary coil L1b and the secondary coil L2b, the auxiliary coil L3b, a fourth electric power source 74 and a sixth detection switch SW6 (hereinafter the sixth switch SW6). In the second current sensor 7, the primary coil L1b, the secondary coil L2b and the auxiliary coil L3b have the second common core C2. The sixth switch SW6 allows and prohibits DC power supply from the fourth electric power source 74 to the auxiliary coil L3b.

In the second current transformer 22, the auxiliary coil L3b and the secondary coil L2b have the same winding direction.

During the second period P2 in the modification of the second exemplary embodiment, when the fifth switch SW5 in the first current sensor 4 is turned on, the DC voltage of the third DC power source 73 is supplied to the auxiliary coil L3a. During the second period P2, because the direction of the magnetic flux generated by the current, which flows from the second detection terminal TD2 to the first detection terminal DT1, is reverse to the direction of the magnetic flux generated in the auxiliary coil L3a, the magnetic flux generated in the first current transformer 21 is eliminated by the above magnetic flux.

During the first period P1 in the modification of the second exemplary embodiment, when the sixth switch SW6 in the second current sensor 7 is turned on, the DC voltage of the fourth DC power source 74 is supplied to the auxiliary coil L3b. During the first period P1, because the direction of the magnetic flux generated by the current, which flows from the fourth detection terminal TD4 to the third detection terminal DT3, is reverse to the direction of the magnetic flux generated in the auxiliary coil L3b, the magnetic flux generated in the second current transformer 22 is eliminated by the above magnetic flux.

Third Exemplary Embodiment

A description will be given of the electric power conversion device 100 having the AC-DC converter 10 according to a third exemplary embodiment with reference to FIG. 16 and FIG. 17A to FIG. 17I.

A difference in structure and behavior between the third exemplary embodiment and the first exemplary embodiment will be explained. Explanation of the identical components between the third exemplary embodiment and the first exemplary embodiment is omitted here for brevity.

Figure 16:
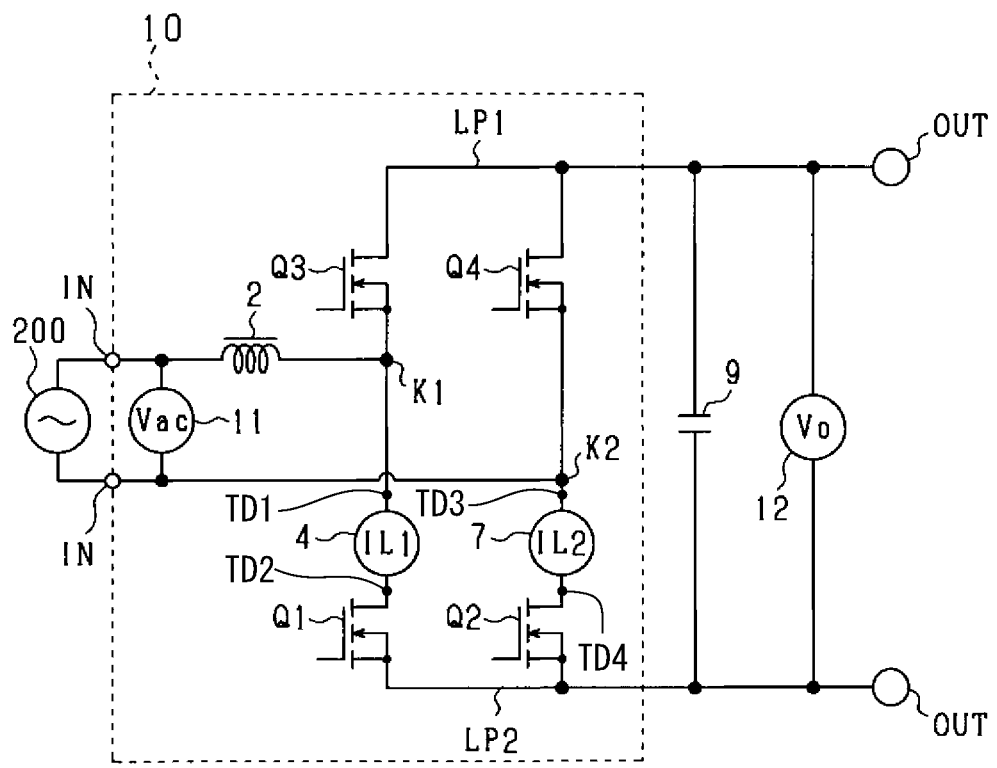
FIG. 16 is a view showing a circuit structure of the AC-DC converter in the electric power conversion device according to a third exemplary embodiment of the present invention.

FIG. 16 is a view showing a circuit structure of the AC-DC converter 10 in the electric power conversion device 100 according to the third exemplary embodiment. In the structure of the AC-DC converter 10 of the electric power conversion device 100 according to the third exemplary embodiment shown in FIG. 16, a third synchronous rectifier switch Q3 is arranged at a high voltage side of the first drive switch Q1 instead of the first main diode Dm1. Further, a fourth synchronous rectifier switch Q4 is arranged at a high voltage side of the second drive switch Q2 instead of the second main diode Dm2.

A description will now be given of a detailed structure of the AC-DC converter 10 according to the third exemplary embodiment with reference to FIG. 16 and FIG. 17A to FIG. 17I.

As shown in FIG. 16, the drain of the first drive switch Q1 is connected to the source of the third synchronous rectifier switch Q3 to form a series connection unit. The drain of the second drive switch Q2 is connected to the source of the fourth synchronous rectifier switch Q4 to form a series connection unit. The drain of the third synchronous rectifier switch Q3 is connected to the first line LP1. The drain of the fourth synchronous rectifier switch Q4 is also connected to the first line LP1.

As shown in FIG. 16, the first current sensor 4 is connected to the drain of the first drive switch Q1 and connected to the first connection node K1. The connection node K1 is connected to the source of the third synchronous rectifier switch Q3. Further, the second current sensor 7 is connected to the drain of the second drive switch Q2 and connected to the second connection node K2. The second connection node K2 is connected to the source of the fourth synchronous rectifier switch Q4.

FIG. 17A to FIG. 17I are timing charts explaining the operation of the electric power conversion device 100 according to the third exemplary embodiment of the present invention. In more detail, FIG. 17A shows a transition of the input voltage Vac. FIG. 17B shows a transition of the first selection signal AQ1. FIG. 17C shows a transition of the second selection signal AQ2. FIG. 17D shows a transition of the first switch signal CT1. FIG. 17E shows a transition of the second switch signal CT2. FIG. 17F shows a transition of the first gate signal GS1. FIG. 17G shows a transition of the second gate signal GS2. FIG. 17H shows a transition of a third gate signal GS3 with which the third synchronous rectifier switch Q3 is turned on/off. FIG. 17I shows a transition of a fourth gate signal GS4 with which the fourth synchronous rectifier switch Q4 is turned on/off.

During the first period P1 in which the input voltage Vac has a positive polarity, the control device 30 generates the first selection signal AQ1 of a high level. The control device 30 generates the third gate signal GS3 of a high level/low level so as to drive the third synchronous rectifier switch Q3. The control device 30 generates the first gate signal GS1 of a high level/low level so as to drive the first drive switch Q1. In the third exemplary embodiment, the control device 30 generates the third gate signal GS3 which is inverted of the first gate signal GS1. Further, the control device 30 generates the fourth gate signal GS4 of a high level so as to turn on the fourth drive switch Q4.

During the first period P1, the control device 30 generates the second switch signal CT2 of a high level in the second current sensor 7 so as to turn on the second switch SW2. The current path through which the current flows from the secondary coil L2b is generated in the second current sensor 7. The formation of the current path in the second current sensor 7 makes it possible to suppress a density of the magnetic flux in the second current transformer 22 from increasing.

During the second period P2 in which the input voltage Vac has a negative polarity, the control device 30 generates the second selection signal AQ2 of a high level. The control device 30 generates the fourth gate signal GS4 of a high level/low level so as to drive the fourth synchronous rectifier switch Q4. The control device 30 generates the second gate signal GS2 of a high level/low level so as to drive the second drive switch Q2. In the third exemplary embodiment, the control device 30 generates the fourth gate signal GS4 which is inverted of the second gate signal GS2. Further, the control device 30 generates the third gate signal GS3 of a high level so as to turn on the third drive switch Q3.

During the second period P2, the control device 30 generates the first switch signal CT1 of a high level in the first current sensor 4 so as to turn on the first switch SW1. The current path through which the current flows from the secondary coil L2a is generated in the first current sensor 4. The formation of the current path in the first current sensor 4 makes it possible to suppress a density of the magnetic flux in the first current transformer 21 from increasing.

As previously described, the electric power conversion device 100 having the structure according to the third exemplary embodiment shown in FIG. 16 has the same as the electric power conversion device 100 according to the first exemplary embodiment.

Fourth Exemplary Embodiment

A description will be given of the electric power conversion device 100 having the AC-DC converter 10 according to a fourth exemplary embodiment with reference to FIG. 18.

A difference in structure and behavior between the fourth exemplary embodiment and the first exemplary embodiment will be explained. Explanation of the identical components between the fourth exemplary embodiment and the first exemplary embodiment is omitted here for brevity.

The AC-DC converter 10 according to the fourth exemplary embodiment is of a totem pole type. FIG. 18 is a view showing a circuit structure of the AC-DC converter 10 in the electric power conversion device 100 according to the fourth exemplary embodiment of the present invention.

Figure 18:
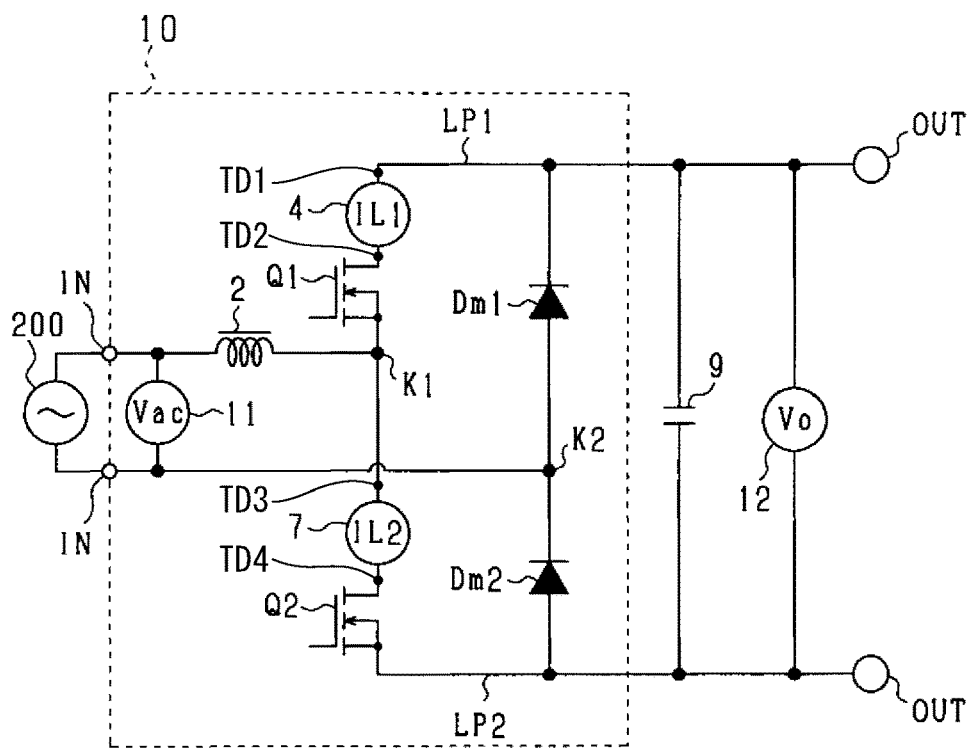
FIG. 18 is a view showing a circuit structure of the AC-DC converter in the electric power conversion device according to a fourth exemplary embodiment of the present invention.

In the AC-DC converter 10 shown in FIG. 18, the source of the first drive switch Q1 is connected to the drain of the second drive switch Q2 so as to form a series connection unit. The anode of the first main diode Dm1 is connected to the cathode of the second main diode Dm2 so as to form a series connection unit. The drain of the first drive switch Q1 is connected to the first line LP1, and the source of the second drive switch Q2 is connected to the second line LP2. The cathode of the first main diode Dm1 is connected to the smoothing capacitor 9, and connected to the first current sensor 4 through the first line LP1. The anode of the second main diode Dm2 is connected to the smoothing capacitor 9, and connected to the source of the second drive switch Q2 through the second line LP2.

The first connection node K1, through which the first drive switch Q1 is connected to the second drive switch Q2, is connected to the first terminal of the AC power source 200 through the reactor 2. The second connection node K2, through which the first main diode Dm1 is connected to the second main diode Dm2, is connected to the second terminal of the AC power source 200.

In the structure of the AC-DC converter 10 according to the fourth exemplary embodiment shown in FIG. 18, the first current sensor 4 is connected between the first line LP1 and the drain of the first drive switch Q1 at a high level side. Specifically, the first detection terminal TD1 of the first current sensor 4 is connected to the first line LP1, and the second detection terminal TD2 of the first current sensor 4 is connected to the drain of the first drive switch Q1. The second current sensor 7 is connected to the second drive switch Q2 and connected to the first connection node K1. That is, the second current sensor 7 is arranged on a wiring between the source of the first drive switch Q1 and the drain of the second drive switch Q2. Specifically, the third detection terminal TD3 of the second current sensor 7 is connected to the first connection node K1, and the fourth detection terminal TD4 of the second current sensor 7 is connected to the drain of the second drive switch Q2.

In the structure of the AC-DC converter 10 according to the fourth exemplary embodiment shown in FIG. 18, a negative current flows in the second current sensor 7 during the first period P1 in which the input voltage Vac has a positive polarity. Further, a negative current flows in the first current sensor 4 during the second period P2 in which the input voltage Vac has a negative polarity.

Accordingly, during the first period P1, the control device 30 generates the second switch signal CT2 and transmits the second switch signal CT2 to the second switch SW2 in the second current sensor 7 so as to reduce the magnetic flux generated in the second current transformer 22 in the second current sensor 7.

Further, during the second period P2, the control device 30 generates the first switch signal CT1 and transmits the first switch signal CT1 to the first switch SW1 in the first current sensor 4 so as to reduce the magnetic flux generated in the first current transformer 21 in the first current sensor 4.

As previously described, the electric power conversion device 100 having the structure according to the fourth exemplary embodiment shown in FIG. 18 has the same as the electric power conversion device 100 according to the first exemplary embodiment.

(Modification of the Fourth Exemplary Embodiment)

A description will be given of the first current sensor 4 and the second current sensor 7 in the AC-DC controller 10 of the electric power conversion device 100 according to a modification of the fourth exemplary embodiment with reference to FIG. 19.

It is possible for the AC-DC controller 10 of a totem pole type to have a structure in which the first main diode Dm1 and the second main diode Dm2 are replaced with a fifth drive switch Q5 and a sixth drive switch Q6, respectively. The fifth drive switch Q5 and the sixth drive switch Q6 are used for performing a synchronous rectifier control.

Figure 19:
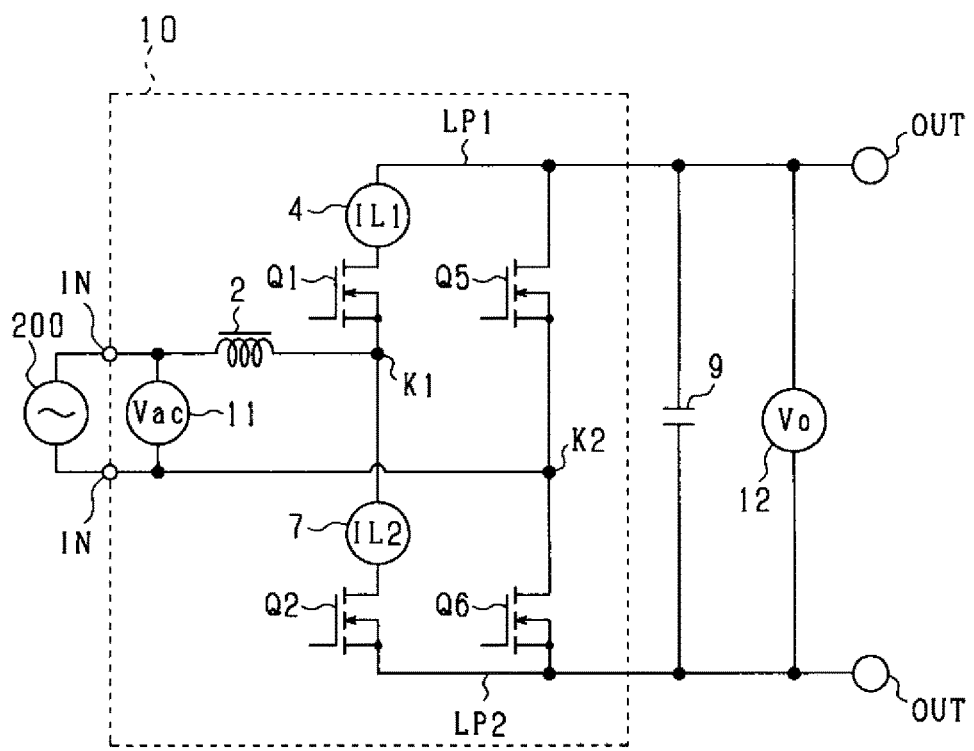
FIG. 19 is a view showing a circuit structure of a modification of the AC-DC converter in the electric power conversion device according to the fourth exemplary embodiment of the present invention.

FIG. 19 is a view showing a circuit structure of the modification of the AC-DC converter 10 in the electric power conversion device 100 according to the fourth exemplary embodiment of the present invention. As shown in FIG. 19, a drain of the sixth drive switch Q6 is connected to a source of the fifth drive switch Q5 so as to form a series connection unit. A drain of the fifth drive switch Q5 is connected to the first line LP1, and a source of the sixth drive switch Q6 is connected to the second line LP2.

As previously described, the electric power conversion device 100 having the structure according to the modification of the fourth exemplary embodiment shown in FIG. 19 has the same as the electric power conversion device 100 according to the first exemplary embodiment.

Fifth Exemplary Embodiment

A description will be given of the electric power conversion device 100 having the AC-DC converter 10 according to a fifth exemplary embodiment with reference to FIG. 20.

A difference in structure and behavior between the fifth exemplary embodiment and the first exemplary embodiment will be explained. The explanation of the identical components between the fifth exemplary embodiment and the first exemplary embodiment is omitted here for brevity.

The AC-DC converter 10 according to the fifth exemplary embodiment is of a balance type. FIG. 20 is a view showing a circuit structure of the AC-DC converter 10 in the electric power conversion device 100 according to the fifth exemplary embodiment of the present invention.

Figure 20:
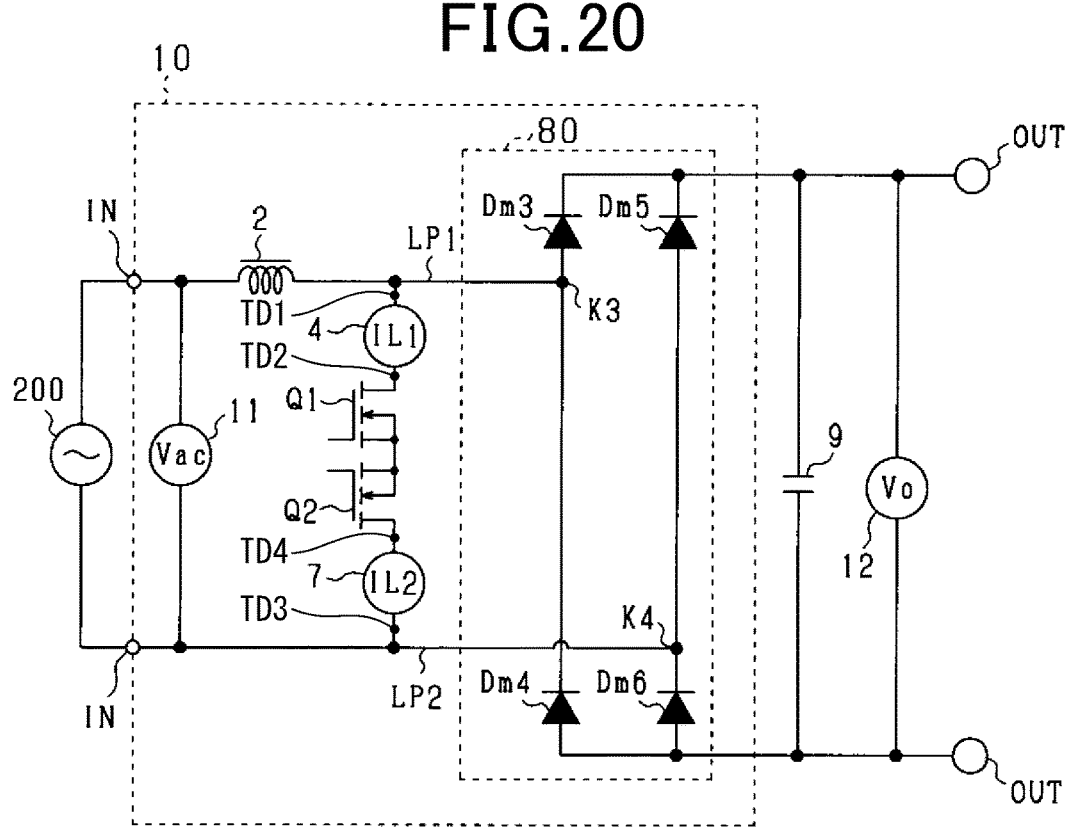
FIG. 20 is a view showing a circuit structure of the AC-DC converter in the electric power conversion device according to a fifth exemplary embodiment of the present invention.

In the AC-DC converter 10 shown in FIG. 20, the source of the first drive switch Q1 is connected to the drain of the second drive switch Q2 so as to form a series connection unit.

The drain of the first drive switch Q1 is connected to the first line LP1 through the first current sensor 4. The drain of the second drive switch Q2 is connected to the second line LP2 through the second current sensor 7.

Further, as shown in FIG. 20, a bridge circuit 80 is connected to the first line LP1 and the second line LP2. The bridge circuit 80 is composed of a third main diode Dm3, a fourth main diode Dm4, a fifth main diode Dm5 and a sixth main diode Dm6. An anode of the third main diode Dm3 is connected to a cathode of the fourth main diode Dm4 so as to form a series connection unit. An anode of the fifth main diode Dm5 is connected to a cathode of the sixth main diode Dm6 so as to form a series connection unit. A cathode of the third main diode Dm3 and a cathode of the fifth main diode Dm5 are connected parallel to each other. An anode of the fourth main diode Dm4 and an anode of the sixth main diode Dm6 are connected parallel to each other.

The first line Lp1 is connected to a third connection node K3. The third connection node K3 is connected to the anode of the third main diode Dm3 and connected to the cathode of the fourth main diode Dm4. The second line Lp2 is connected to a fourth connection node K4. The fourth connection node K4 is connected to the anode of the fifth main diode Dm5 and connected to the cathode of the sixth main diode Dm6. The first current sensor 4 is connected between the drain of the first drive switch Q1 and the first line LP1. Specifically, the first detection terminal TD1 of the first current sensor 4 is connected to the first line LP1. The second detection terminal TD2 of the first current sensor 4 is connected to the drain of the first drive switch Q1.

The second current sensor 7 is connected between the drain of the second drive switch Q2 and the second line LP2. Specifically, the third detection terminal TD3 of the second current sensor 7 is connected to the second line LP2. The fourth detection terminal TD4 of the second current sensor 7 is connected to the drain of the second drive switch Q2.

In the structure of the AC-DC converter 10 according to the fifth exemplary embodiment shown in FIG. 20, a negative current flows in the second current sensor 7 during the first period P1 in which the input voltage Vac has a positive polarity. Further, a negative current flows in the first current sensor 4 during the second period P2 in which the input voltage Vac has a negative polarity.

Accordingly, during the first period P1, the control device 30 generates the second switch signal CT2 of a high level and transmits the second switch signal CT2 of the high level to the second switch SW2 in the second current sensor 7 so as to reduce the magnetic flux generated in the second current transformer 22 in the second current sensor 7.

Further, during the second period P2, the control device 30 generates the first switch signal CT1 of a high level and transmits the first switch signal CT1 of the high level to the first switch SW1 in the first current sensor 4 so as to reduce the magnetic flux generated in the first current transformer 21 in the first current sensor 4.

As previously described, the electric power conversion device 100 having the structure according to the fifth exemplary embodiment shown in FIG. 20 has the same as the electric power conversion device 100 according to the first exemplary embodiment.

(Modification of the Fifth Exemplary Embodiment)

A description will be given of the AC-DC controller 10 of the electric power conversion device 100 according to a modification of the fifth exemplary embodiment with reference to FIG. 21.

It is possible for the AC-DC controller 10 to have the bridge circuit 80 composed of drive switches instead of using the main diodes.

Figure 21:
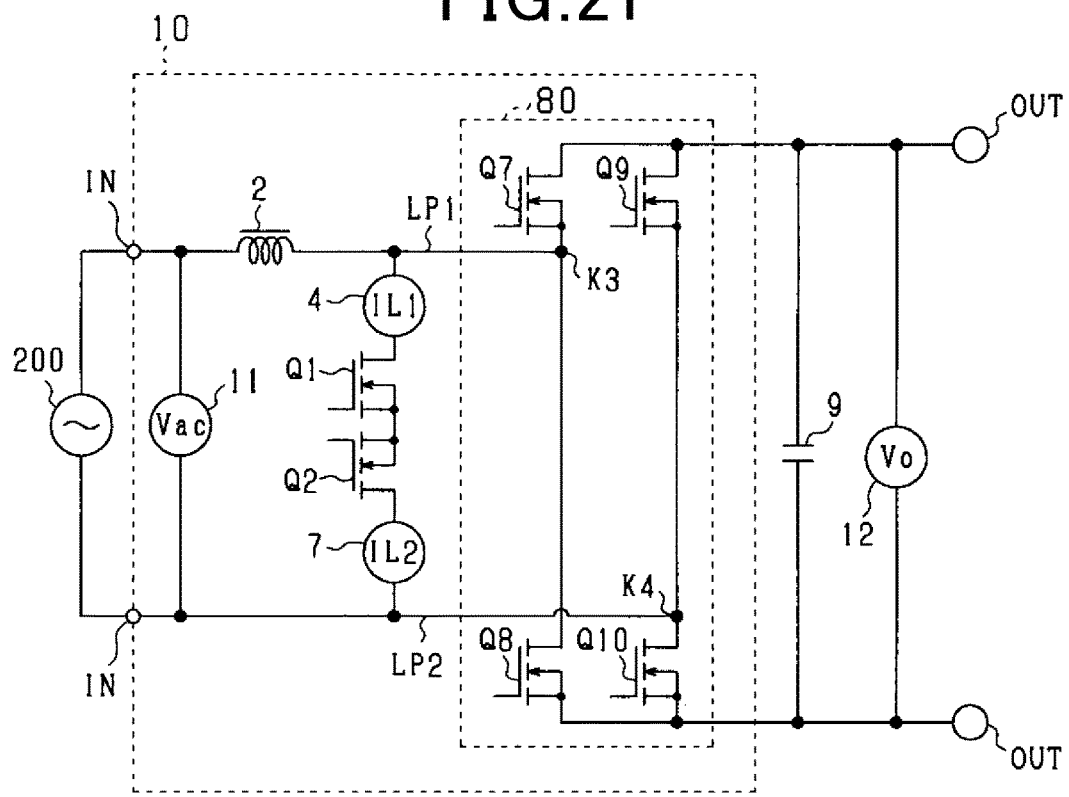
FIG. 21 is a view showing a circuit structure of a modification of the AC-DC converter in the electric power conversion device according to the fifth exemplary embodiment of the present invention.

FIG. 21 is a view showing a circuit structure of a modification of the AC-DC converter 10 in the electric power conversion device 100 according to the fifth exemplary embodiment of the present invention. In the structure of the bridge circuit 80 in the AC-DC converter 10 according to the modification of the fifth exemplary embodiment shown in FIG. 21, the bridge circuit 80 is composed of a seventh drive switch Q7, an eighth drive switch Q8, a ninth drive switch Q9 and a tenth drive switch Q10. A source of the seventh drive switch Q7 is connected to a drain of the eighth drive switch Q8 so as to form a series connection unit. Further, a source of the ninth drive switch Q9 is connected to a drain of the tenth drive switch Q10 so as to form a series connection unit. A drain of the seventh drive switch Q7 is connected to a drain of the ninth drive switch Q9. A source of the eighth drive switch Q8 is connected to a source of the tenth drive switch Q10.

As previously described, the electric power conversion device 100 having the structure according to the modification of the fifth exemplary embodiment shown in FIG. 21 has the same as the electric power conversion device 100 according to the first exemplary embodiment.

Other Modifications

The concept of the present invention is not limited by the first to fifth exemplary embodiments and the modifications thereof. For example, it is possible for the electric power conversion device 100 to have the following various modifications.

It is possible for the control device 30 to perform an average current mode control of the first drive switch Q1 and the second drive switch Q2 on the basis of the average value of the reactor current.

When the control device 30 performs the peak current mode control, there is a possible case in which a deviation of the input current Iac, to be supplied from the AC power source 200 to the AC-DC converter 10, occurs around a zero cross point. In order to avoid this, it is acceptable for the electric power conversion device 100 to calculate a correction value of the instruction current IL*, as disclosed in Japanese patent laid open publication No. 2015-198460, so as to avoid the deviation of the input current Iac around the zero cross point. In this case, the current correction part 37 calculates an correction value offset so as to increase an absolute value of the pre-correction instruction current around the zero cross point. In addition, the adder 336 adds the absolute value of the pre-correction instruction current transmitted from the current correction part 37 with the correction value offset. In the control device 30 (see FIG. 3), the adder 336 transmits the addition result as the instruction current IL* to the first current control part 35 and the second current control part 36.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
an electric power converter configured to convert an input alternating current voltage (input AC voltage) supplied from an alternating current power source (AC power source) to a direct current voltage (DC voltage), and supply the DC voltage through an output terminal of the electric power conversion device to outside of the electric power converter, the electric power converter comprising:
a reactor connected to the AC power source;
a first drive switch;
a second drive switch;
a first current sensor connected to the first drive switch, the first current sensor comprising:
a first current transformer comprising a primary coil and a secondary coil;
a first detection resistance connected parallel with the secondary coil of the first current transformer;
a first rectifier diode configured to allow a current to flow from the secondary coil to the first detection resistance when a positive current flows in the secondary coil of the first current transformer, and prohibit the current from flowing to the first detection resistance from the secondary coil of the first current transformer when a negative current flows in the secondary coil of the first current transformer; and
a detection switch arranged parallel with one of the primary coil and the secondary coil; and
a second current sensor connected to the second drive switch, the second current sensor comprising:
a second current transformer comprising a primary coil and a secondary coil;
a second detection resistance connected parallel with the secondary coil of the second current transformer;
a second rectifier diode configured to allow a current to flow from the secondary coil of the second current transformer to the second detection resistance when a positive current flows in the secondary coil of the second current transformer, and prohibit the current from flowing to the second detection resistance from the secondary coil of the second current transformer when a negative current flows in the secondary coil of the second current transformer; and
a detection switch arranged parallel with one of the primary coil and the secondary coil; and
a control device configured to control the electric power converter, the control device being configured to:
turn on/off control of the first drive switch and the second drive switch so as to determine, as an instruction current, a first current flowing in the first drive switch during a first period in which the input AC voltage has a positive polarity, and to determine, as the instruction current, a second current flowing in the second drive switch during a second period in which the input AC voltage has a negative polarity;
turn on the detection switch of the second current sensor during the first period, and turn on the detection switch of the first current sensor during the second period; and
temporarily turn on the detection switch in the second current sensor during the first period, and temporarily turn on the detection switch in the first current sensor during the second period,
wherein the secondary coil has a turn number which is more than a turn number of the primary coil in each of the first current transformer and the second current transformer,
the detection switch of each of the first current sensor and the second current sensor is connected parallel with the secondary coil at a location closer to a secondary coil side than to a location of either the first rectifier diode or the second rectifier diode, and a series connection unit composed of the detection switch and a direct current power source is connected parallel with the secondary coil in each of the first current sensor and the second current sensor.

2. The electric power conversion device according to claim 1, wherein the control device is configured to:
perform a peak current mode control during the first period so as to operate the first drive switch so that the first current is limited by the instruction current;
perform the peak current mode control during the second period so as to operate the second drive switch so that the second current is limited by the instruction current;
turn on the detection switch of the second current sensor during a duration in which the first drive switch is operated in the peak current mode control; and
turn on the detection switch of the first current sensor during a duration in which the second drive switch is operated in the peak current mode control.

3. The electric power conversion device according to claim 1,
wherein the electric power converter further comprises a first drive-side rectifier element and a second drive-side rectifier element, and the first drive switch and the first drive-side rectifier element form a series connection unit, and the second drive switch and the second drive-side rectifier element form a series connection unit,
wherein a first terminal of the AC power source is connected through the reactor to a connection node between the first drive switch and the first drive-side rectifier element, and a second terminal of the AC power source is connected to a connection node between the second drive switch and the second drive-side rectifier element.

4. The electric power conversion device according to claim 1, wherein in the electric power converter, the first drive switch and the second drive switch form a first series connection unit, and a pair of drive-side rectifier elements form a second series connection unit, and the first series connection unit and the second series connection unit are arranged parallel with each other, and a connection node between the first drive switch and the second drive switch in the first series connection unit is connected through the reactor to a first terminal of the AC power source, and a connection node between the pair of drive-side rectifier elements is connected to a second terminal of the AC power source.

5. An electric power conversion device comprising:
an electric power converter configured to convert an input alternating current voltage (input AC voltage) supplied from an alternating current power source (AC power source) to a direct current voltage (DC voltage), and the DC voltage through an output terminal of the electric power conversion device to outside of the electric power converter, the electric power converter comprising:
a reactor connected to the AC power source;
a first drive switch;
a second drive switch;
a first current sensor connected to the first drive switch, the first current sensor comprising:
a first current transformer comprising a primary coil and a secondary coil;
a first detection resistance connected parallel with the secondary coil of the first current transformer;
a first rectifier diode configured to allow a current to flow from the secondary coil to the first detection resistance when a positive current flows in the secondary coil of the first current transformer, and prohibit the current from flowing to the first detection resistance from the secondary coil of the first current transformer when a negative current flows in the secondary coil of the first current transformer;
an auxiliary coil magnetically connected with the primary coil and the secondary coil in the first current transformer;
a switch connected to the auxiliary coil; and
a direct current power source connected in series to the switch and the auxiliary coil; and
a second current sensor connected to the second drive switch, the second current sensor comprising:
a second current transformer comprising a primary coil and a secondary coil;
a second detection resistance connected parallel with the secondary coil of the second current transformer;
a second rectifier diode configured to allow a current to flow from the secondary coil of the second current transformer to the second detection resistance when a positive current flows in the secondary coil of the second current transformer, and prohibit the current from flowing to the second detection resistance from the secondary coil of the second current transformer when a negative current flows in the secondary coil of the second current transformer;
an auxiliary coil magnetically connected with the primary coil and the secondary coil in the second current transformer;
a switch connected to the auxiliary coil; and
a direct current power source connected in series to the switch connected to the auxiliary coil; and
a control device configured to control the electric power converter, the control device being configured to:
turn on/off control of the first drive switch and the second drive switch so as to determine, as an instruction current, a first current flowing in the first drive switch during a first period in which the input AC voltage has a positive polarity, and to determine, as the instruction current, a second current flowing in the second drive switch during a second period in which the input AC voltage has a negative polarity; and
temporarily turn on the switch of the second current sensor during the first period, and temporarily turn on the switch of the first current sensor during the second period in order for the direct current power source to supply, to the auxiliary coil, a voltage having an inverted polarity which is inverted from the polarity of the voltage supplied to the primary coil of the first current transformer and a primary coil of the second current transformer,
wherein the secondary coil has a turn number which is more than a turn number of the primary coil in each of the first current transformer and the second current transformer.

* * * * *